United States Patent
Nakai

(10) Patent No.: US 9,356,549 B2
(45) Date of Patent: May 31, 2016

(54) CONTROL DEVICE OF AC MOTOR

(71) Applicant: DENSO CORPORATION, Kariya, Aichi-pref. (JP)

(72) Inventor: Yasuhiro Nakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 406 days.

(21) Appl. No.: 14/095,987

(22) Filed: Dec. 3, 2013

(65) Prior Publication Data

US 2014/0152205 A1    Jun. 5, 2014

(30) Foreign Application Priority Data

Dec. 3, 2012 (JP) ................................. 2012-264210
Mar. 13, 2013 (JP) ................................. 2013-050474

(51) Int. Cl.
*H02P 21/00* (2006.01)
*H02P 21/05* (2006.01)

(52) U.S. Cl.
CPC ............ *H02P 21/05* (2013.01); *H02P 2209/13* (2013.01)

(58) Field of Classification Search
CPC ................................ H02P 21/00; H02P 21/05
USPC ................................ 318/400.02, 400.01, 700
See application file for complete search history.

(56) References Cited

U.S. PATENT DOCUMENTS

| | | |
|---|---|---|
| 2005/0073280 A1 | 4/2005 | Yoshinaga et al. |
| 2013/0038342 A1 | 2/2013 | Nozaki |
| 2013/0214709 A1 | 8/2013 | Omata et al. |
| 2013/0214710 A1 | 8/2013 | Omata et al. |
| 2013/0214711 A1 | 8/2013 | Omata et al. |
| 2013/0214712 A1 | 8/2013 | Omata et al. |
| 2013/0214713 A1 | 8/2013 | Omata et al. |
| 2015/0229247 A1* | 8/2015 | Nakai ................. H02P 29/0038 318/400.02 |
| 2016/0028339 A1* | 1/2016 | Nakai ................. H02P 21/0003 318/400.02 |

FOREIGN PATENT DOCUMENTS

| | | |
|---|---|---|
| JP | 61-186871 | 8/1986 |
| JP | 2002-252995 | 9/2002 |
| JP | 2005-117876 | 4/2005 |
| JP | 2009-303288 | 12/2009 |
| JP | 2010-057217 | 3/2010 |
| JP | 2010-057218 | 3/2010 |
| WO | WO 2011/135652 | 11/2011 |

OTHER PUBLICATIONS

U.S. Appl. No. 13/867,392, filed Apr. 22, 2013, Suzuki et al.
U.S. Appl. No. 13/867,687, filed Apr. 22, 2013, Suzuki et al.
U.S. Appl. No. 13/867,297, filed Apr. 22, 2013, Suzuki et al.
U.S. Appl. No. 13/867,319, filed Apr. 22, 2013, Suzuki et al.
U.S. Appl. No. 13/867,282, filed Apr. 22, 2013, Suzuki et al.

* cited by examiner

*Primary Examiner* — Kawing Chan
(74) *Attorney, Agent, or Firm* — Nixon & Vanderhye PC

(57) ABSTRACT

A control device of a three-phase AC motor includes: an inverter for driving the motor; a current sensor for sensing a current; and a control means for controlling the motor by switching on/off each switching element in the inverter with feeding back dq axis current calculated values to dq axis current command values, or with feeding back a torque estimated value to a torque command value. The control means includes one first order current operation part that: expands a phase current sensed value of one phase in Fourier series as a function of an electric angle; extracts a first order component of the Fourier series; operates a first order current operated value; and integrates a calculated value based on the phase current sensed value at an integral angle for k periods of the electric angle so that Fourier coefficients are calculated.

11 Claims, 17 Drawing Sheets

| FB CONT TYPE | CUR FB CONT | | TOR FB CONT |
|---|---|---|---|
| CONT MODE | SINE PWM | OVERMOD PWM | SQ WAVE (1 PULSE) |
| INV OUT VOL W-FORM | FUND W COMP | FUND W COMP | FUND W COMP |
| MOD FACTOR m | 0~1.27 | | 1.27 |
| FEATURE | SMALL TOR VAR | OUT INCREASE IN MID SP | OUT INCREASE IN HI SP |

_US 9,356,549 B2_

CONTROL DEVICE OF AC MOTOR

CROSS REFERENCE TO RELATED APPLICATIONS

This application is based on Japanese Patent Applications No. 2012-264210 filed on Dec. 3, 2012, and No. 2013-50474 filed on Mar. 13, 2013, the disclosures of which are incorporated herein by reference.

TECHNICAL FIELD

The present disclosure relates to a control device of an AC motor that controls a passage of current through the AC motor on the basis of a phase current sensed value sensed by a current sensor.

BACKGROUND

In recent years, from the social requirement of lower fuel consumption and less exhaust emission, an electric automobile and a hybrid automobile, each of which is mounted with an AC motor as a power source of a vehicle, is drawing attention. For example, in some of the hybrid automobiles, a DC power source made of a secondary battery or the like and an AC motor are connected to each other via an electric power conversion device constructed of an inverter and the like, and the DC voltage of the DC power source is converted into AC voltage by the inverter to thereby drive the AC motor.

In the control device of the AC motor mounted in the hybrid automobile and the electric automobile, in general, a feedback control is performed on the basis of the phase current sensed value sensed by the current sensor. For example, in a sine wave PWM control mode, dq axis current calculated values obtained by dq transforming the phase current sensed value are fed back to current command values. Further, in a square wave control mode, a torque estimated value is estimated from the dq axis current calculated values and the torque estimated value is fed back to a torque command value.

On the other hand, there is provided a technique of using Fourier transformation for a control technique of an AC motor. For example, an object of a technique disclosed in a patent document 1 is to reduce a torque pulsation by Fourier transforming a torque sensed value directly sensed by a torque meter or a torque estimated value estimated on the basis of a current sensed value and by extracting arbitrary order component and by performing a learning control in such a way that the Fourier coefficient of the order becomes 0.

In the meantime, in the control device of an AC motor, there are cases where a phase current has higher order components superimposed thereon and where the phase current is offset.

When the phase current has the higher order components superimposed thereon, for example, the command duties of the respective phases obtained as the result of the current feedback control also have higher order components superimposed thereon, which hence results in making also noise components such as the switching noises of the inverter include higher order components. These noises are not desirable in the aspect of silence. In particular, in an overmodulation range, a PWM pulse includes higher order components and hence the phase current has the higher order components easily superimposed thereon, which presents a problem of causing larger noises.

Further, when the phase current is offset, an electric first order torque variation and power variation will be caused. In a control device of an AC motor mounted in a vehicle, the torque variation vibrates the vehicle and hence is not desirable. The power variation varies a power source current and a power source voltage and hence is not desirable in terms of the protection of parts.

In this regard, that the phase current is offset means a center value of a current amplitude is offset from a reference value of 0 [A] learned on the basis of the phase current when the device is started up. This is mainly caused from the temperature characteristic of a circuit for receiving an output signal of the current sensor and the amount of offset tends to gradually increase as the control device of the AC motor is continuously driven.

Further, in the square wave control mode of a three phase AC motor, the respective phases are on and off once every one period of an electric angle, that is, are switched on and off 6 times in total and hence the phase current has sixth order components synchronous with the switching superimposed thereon. When it is tried to remove the sixth order components by a low-pass filter, a current vector is likely to be excessively smoothed, which hence is likely to be detrimental to recognition. Therefore, a torque feedback has a gain forcibly made lower, which results in reducing a torque response.

For the problems described above, in the technique of the patent document 1, Fourier transformation is only applied to a torque sensed value or a torque estimated value and the object of the technique is manly to reduce a torque pulsation. Hence, by the technique of the patent document 1, it is not possible to reduce noises caused by the higher order components and to prevent a harmful effect produced by the offset of the phase current.

[Patent Document 1] JP-A-2010-57218

SUMMARY

It is an object of the present disclosure to provide a control device of an AC motor that can reduce noises caused by higher order components and that can suppress torque variation and power variation caused by an offset of a phase current.

According to an aspect of the present disclosure, a control device of a three-phase alternate current motor includes: an inverter having a plurality of switching elements for driving the alternate current motor; at least one current sensor, which senses a current flowing in a respective phase among three phases of the alternate current motor at a given sampling timing; and a control means that switches on and off each switching element by feeding back a plurality of dq axis current calculated values, which are obtained by dq transforming a plurality of phase current sensed values in two or more phases sensed by a plurality of current sensors, or obtained by dq transforming a phase current sensed value of one phase and a current estimated value of other phase estimated from the phase current sensed value of the one phase, to a plurality of dq axis current command values, or by feeding back a torque estimated value, which is estimated based on the dq axis current calculated values, to a torque command value, so that the control means controls the current passing through the alternate current motor. The control means includes at least one first order current operation part that: expands a phase current sensed value of one phase in Fourier series as a function of an electric angle; extracts a first order component of the Fourier series; and operates a first order current operated value of the one phase. The at least one first order current operation part integrates a calculated value based on the phase current sensed value of the one phase at an integral angle for k periods of the electric angle so that Fourier coefficients are calculated. The integral angle is set by dividing the k periods of the electric angle with N, and k represents a natural number, and N represents another natural number.

In the above control device, even in the case where the phase current has the higher order components superimposed thereon or even in the case where the phase current is offset, the dq axis currents can be calculated on the basis of the first order component extracted from Fourier series in which the phase current is expanded. Hence, a current feedback control is performed on the basis of the dq axis current calculated values not containing the higher order components, so that command duties of the respective phases generated as the result do not have higher order components superimposed thereon. Therefore, it is possible to reduce noises caused by the switching noises or the like of the inverter. In particular, in an overmodulation range, the effect of reducing noises becomes remarkable.

Further, by removing a direct component of 0-th order component, it is possible to correct the offset of the phase current and to suppress a torque variation and a power variation of the AC motor.

Still further, a current vector is not smoothed by the use of a low-pass filter so as to remove sixth order components in a square wave control mode, so that it is possible to avoid a problem such that a reduction in torque response is caused by lowering a gain.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Hereinafter, embodiments of a control device of an AC motor according to the present disclosure will be described on the basis of the drawings. First, a construction common to a plurality of embodiments will be described with reference to FIG. 1 and FIG. 2. An electric motor control device 10 as "a control device of an AC motor" according to this embodiment is applied to an electric motor drive system for driving a hybrid automobile.

(Construction of Control Device of AC Motor)

Figure 1:
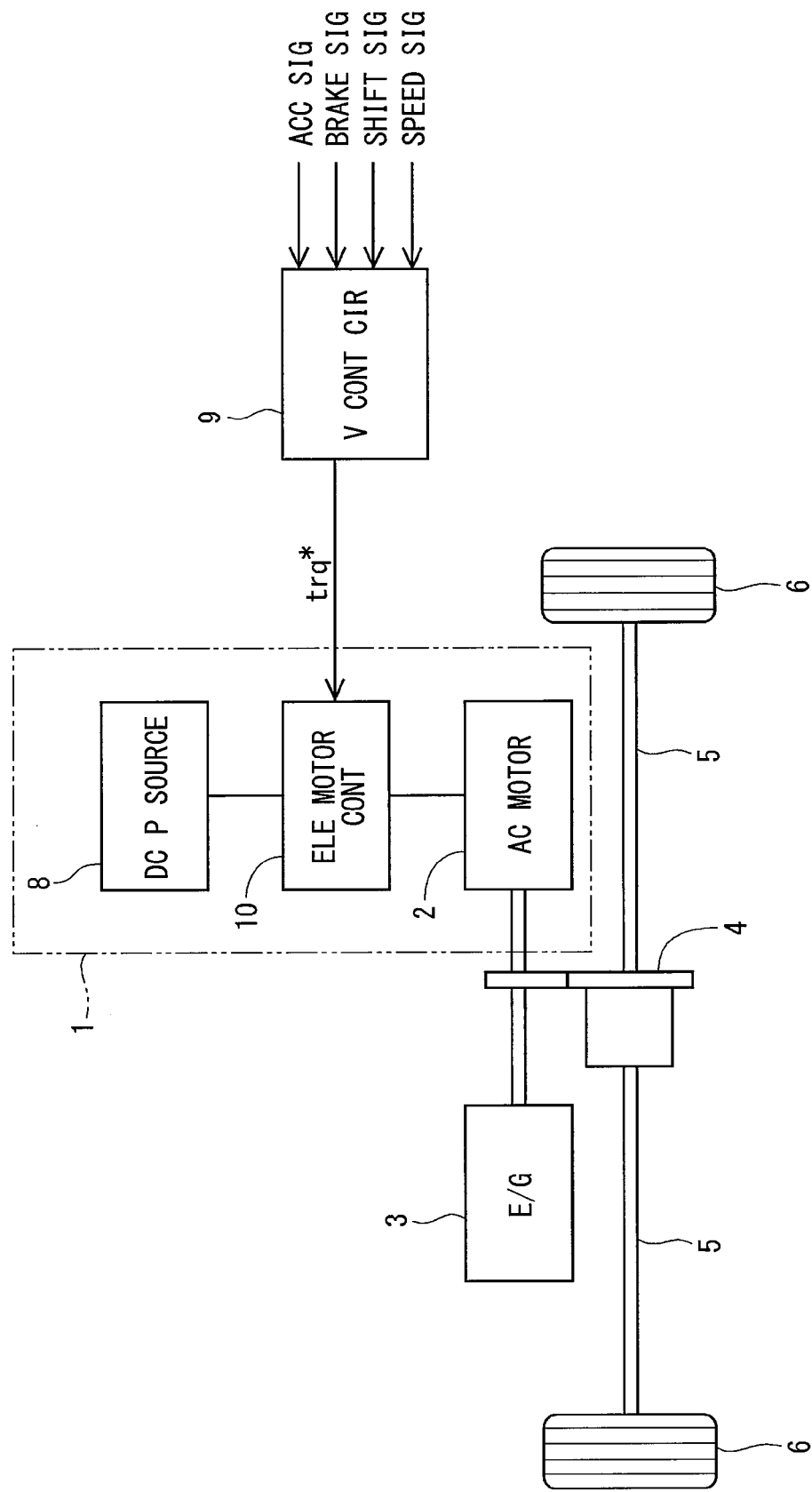
FIG. 1 is a diagram to show a construction of an electric motor drive system to which a control device of an AC motor according to a first embodiment to an eighth embodiment of the present disclosure is applied.

As shown in FIG. 1, an electric motor drive system 1 includes an AC motor 2, a DC power source 8, the electric motor control device 10, and the like.

The AC motor 2 is, for example, an electric motor for generating torque for driving the driving wheels 6 of an electric vehicle. The AC motor 2 of the present embodiment is a three phase AC motor of a permanent magnet synchronous type.

It is assumed that the electric vehicle includes a vehicle for driving the driving wheels 6 by electric energy such as a hybrid automobile, an electric automobile, and a vehicle powered by a fuel battery. The electric vehicle of the present embodiment is a hybrid vehicle provided with an engine 3, and the AC motor 2 is a so-called motor generator (designated by "MG" in the drawing) having a function as an electric motor that generates torque for driving the driving wheels 6 and a function as a generator that is driven by the kinetic energy of the vehicle transmitted from the engine 3 and the driving wheels 6 and that can generate electricity.

The AC motor 2 is coupled to an axle 5 via a gear 4, for example, a transmission. In this way, the driving force of the AC motor 2 rotates the axle 5 via the gear 4 to thereby drive the driving wheels 6.

The DC power source 8 is an electric storage device that can charge and discharge, for example, a secondary battery such as a nickel metal hydride battery or a lithium ion battery, and an electric double-layer capacitor. The DC power source 8 is connected to an inverter 12 (see FIG. 2) of the electric motor control device 10, that is, the DC power source 8 is so constructed as to supply electricity to the AC motor 2 and to be supplied with electricity from the AC motor 2 via the inverter 12.

A vehicle control circuit 9 is constructed of a microcomputer and the like and is provided with a CPU, a ROM, an I/O, and a bass line for connecting these elements, all of which are not shown in the drawings. The vehicle control circuit 9 controls the whole of the electric vehicle by a software processing, which is performed by executing previously stored programs by the CPU, and by a hardware processing, which is performed by a dedicated electronic circuit.

The vehicle control circuit 9 is so constructed as to be able to acquire signals from various kinds of sensors and switches such as an accelerator signal from an accelerator sensor, a brake signal from a brake switch, and a shift signal from a shift switch, all of which are not shown in the drawings. The vehicle control circuit 9 detects a driving state of the vehicle on the basis of the acquired signals and outputs a torque command value trq* responsive to the driving state to the electric motor control device 10. Further, the vehicle control circuit 9 outputs a command signal to an engine control circuit (not shown) for controlling the drive of the engine 3.

Figure 2:
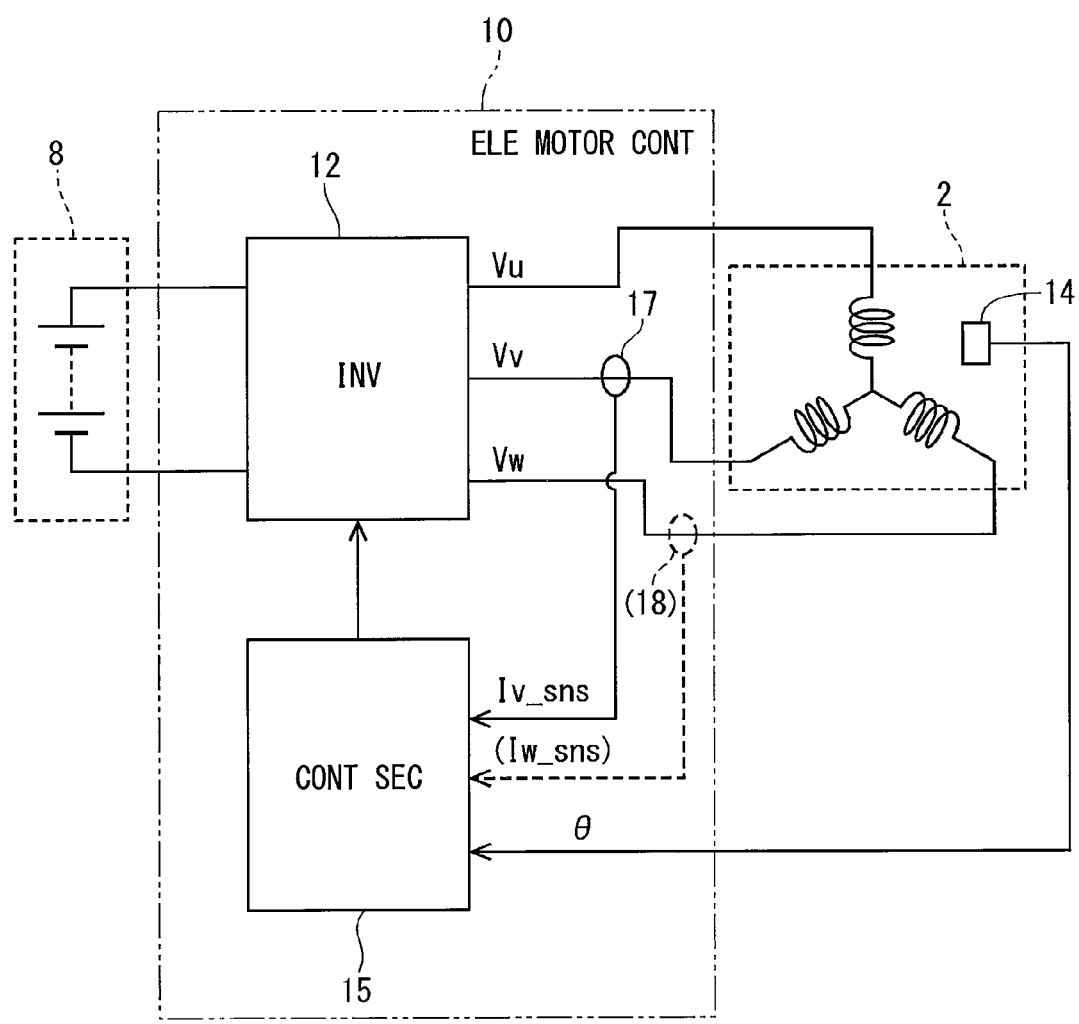
FIG. 2 is a general construction diagram of the control device of the AC motor according to the first embodiment to the eighth embodiment of the present disclosure.

As shown in FIG. 2, the electric motor control device 10 is provided with the inverter 12, a current sensor 17, (18), and a control section 15 as "a control means".

The inverter 12 has a DC power source voltage or a boost voltage of the DC power source inputted thereto as a system voltage VH, the boost voltage being a voltage boosted by a boost converter (not shown). Further, the inverter 12 has six switching elements (not shown) connected in a bridge mode. As to the switching element, for example, an IGBT (Insulated Gate Bipolar Transistor), a MOS (Metal Oxide Semiconductor) transistor, and a bipolar transistor can be used for the switching elements.

In the case where the inverter 12 is driven in a sine wave control mode or an overmodulation control mode, typically, the switching elements are switched on or off on the basis of a PWM signal, whereby three-phase AC voltages Vu, Vv, Vw are impressed on the AC motor and hence the drive of the AC motor 2 is controlled. Alternatively, in the case where the inverter 12 is driven in a square wave control mode, a phase is controlled by a voltage phase command.

The current sensor 17 (18) is a control current sensor for sensing current used for control and does not include a monitor current sensor for monitoring an abnormality. A construction of the electric motor control device 10 according to the embodiment of the present disclosure is broadly divided into a pattern in which current sensors are provided in two phases or more (two phases or three phases) and a pattern in which the current sensor is provided in only one phase. In this sense, in FIG. 2, the reference sign of a current sensor 18 is noted in a parenthesis and the current sensor 18 and an arrow directed to the control section 15 from the current sensor 18 are denoted by a broken line.

In a construction example of the pattern in which the current sensors are provided in two phases, the current sensors 17, 18 are provided respectively in power lines of two phases of a V phase and a W phase which are connected to the AC motor 2 from the inverter 12 and sense phase currents respectively. The current sensed values of the V phase and the W phase by the current sensors 17, 18 are denoted by Iv_sns and Iw_sns.

Here, since the sum of currents of three phases becomes zero from the Kirchhoff's law, when the current values of two phases of three phases are found, the current value of the remaining one phase (U phase in this case) can be found. Hence, the operation of dq transformation in a current feedback control can be performed on the basis of the phase current sensed values of at least two phases.

In the present embodiment, the current sensors 17, 18 are provided in two phases of the V phase and the W phase, but in the other embodiment, the current sensors may be provided in two phases of a U phase and the V phase or the U phase and the W phase. Alternatively, the current sensors may be provided in three phases without using the Kirchhoff's law.

In a construction example of the pattern in which the current sensor is provided in only one phase, the current sensor 17 is provided in the power line of the V phase connected to the AC motor 2 from the inverter 12 and senses a V phase current. The current sensed value of the V phase by the current sensor 17 is designated by Iv_sns. In the other embodiment, the current sensor may be provided in the U phase or the W phase. In the construction in which the current sensor is provided in only one phase, the operation of dq transformation is performed on the basis of the phase current sensed value of the one phase and a current estimated value of the other phase, which is estimated from the phase current sensed value of the one phase. The current estimated value will be later described in detail.

A rotation angle sensor 14 is provided near a rotor (not shown) of the AC motor 2 and senses an electric angle θ and outputs the sensed electric angle θ to the control section 15. Further, the number of revolutions Nr of the AC motor 2 is calculated on the basis of the electric angle θ sensed by the rotation angle sensor 14. The rotation angle sensor 14 of the present embodiment is a resolver but in the other embodiment, an other kind of sensor such as a rotary encoder may be used as the rotation angle sensor 14.

The control section 15 is constructed of a microcomputer and the like and is provided with a CPU, a ROM, an I/O and a bus line for connecting these elements, all of which are not shown in the drawings. The control section 15 controls the movement of the AC motor 2 by a software processing, which is performed by executing previously stored programs by the CPU, or by a hardware processing, which is performed by a dedicated electronic circuit. The detail of the control section 15 will be later described for each embodiment.

According to the number of revolutions Nr of the AC motor 2, which is based on the electric angle θ sensed by the rotation angle sensor 14, and the torque command value trq* from the vehicle control circuit 9, the electric motor control device 10 drives the AC motor 2 as an electric motor to perform a powering operation, thereby consuming electricity, or drives the AC motor 2 as a generator to perform a regenerating operation, thereby generating electricity. Specifically, according to the number of revolutions Nr and to whether the command value trq* is plus or minus, the electric motor control device 10 switches the operation of the AC motor 2 into the following four patterns:

<1. Normal rotation/powering operation> when the number of revolutions Nr is plus and the torque command trq* is plus, the AC motor 2 consumes electricity;

<2. Normal rotation/regenerating operation> when the number of revolutions Nr is plus and the torque command trq* is minus, the AC motor 2 generates electricity;

<3. Reverse rotation/powering operation> when the number of revolutions Nr is minus and the torque command trq* is minus, the AC motor 2 consumes electricity; and <4. Reverse rotation/regenerating operation> when the number of revolutions Nr is minus and the torque command trq* is plus, the AC motor 2 generates electricity.

In the case where the number of revolutions Nr>0 (normal rotation) and the torque command trq*>0, or the number of revolutions Nr<0 (reverse rotation) and the torque command trq*<0, the inverter 12 converts the DC electricity supplied from the DC power source 8 to AC electricity by the switching operation of the switching elements and supplies the AC electricity to the AC motor 2, thereby driving the AC motor 2 in such a way as to output torque (to perform a powering operation).

On the other hand, in the case where the number of revolutions Nr>0 (normal rotation) and the torque command trq*<0, or the number of revolutions Nr<0 (reverse rotation) and the torque command trq*>0, the inverter 12 converts the AC electricity generated by the AC motor 2 to DC electricity by the switching operation of the switching elements and supplies the DC electricity to the DC power source 8, whereby the AC motor 2 performs a regenerating operation.

Here, a control mode of the AC motor 2 by the electric motor control device 10 will be described with reference to FIG. 3. The electric motor control device 10 selects three control modes according to a modulation factor m for power transformation in the inverter 12. Here, the modulation factor m is defined by an equation (1) on the basis of the system voltage VH inputted to the inverter 12 and a magnitude Vr of a voltage vector on a dq axis plane. Here, (Vr/VH) in the equation (1) is a voltage utilization factor.

[Mathematical formula 1]

$$m = 2\sqrt{\frac{2}{3}} \frac{Vr}{VH} \quad (1)$$

When the modulation factor m is from 0 to less than 1.27, a sine wave PWM control mode and an overmodulation PWM control mode are used.

In the sine wave PWM control mode, the switching elements of upper and lower arms of each phase are switched on or off according to a voltage comparison between a voltage command shaped like a sine wave and a carrier wave typified by a triangle wave. As a result, in a set of a high level period corresponding to a period in which a switching element of the upper arm is on and a low level period corresponding to a period in which a switching element of the lower arm is on, duty is controlled in such a way that a fundamental wave component becomes a sine wave in a given period.

In the sine wave PWM control mode, the amplitude of the voltage command shaped like the sine wave is limited to a range less than the amplitude of the carrier wave. For this reason, in the sine wave PWM control mode, a line voltage impressed on the AC motor 2 becomes a sine wave.

In the overmodulation PWM control mode, the same PWM control as the sine wave PWM control mode is performed in a range in which the amplitude of a sine wave component of the voltage command is larger than the amplitude of the carrier wave. In particular, a fundamental wave component can be further enhanced by "a voltage amplitude correction" of distorting the voltage command from its specific sine waveform. In the overmodulation PWM control mode, the amplitude of the sine wave component of the voltage command is larger than the amplitude of the carrier wave, so that a line voltage impressed on the AC motor 2 is not a sine wave but is a distorted voltage.

In the sine wave PWM control mode and the overmodulation PWM control mode is performed "a current feedback control" of controlling the amplitude and the phase of an AC voltage impressed on the AC motor 2 by feeding back an output current.

On the other hand, in a square wave control mode, one pulse of a square wave in which the ratio of a high level period to a low level period is 1:1 in a given period is impressed on the AC motor 2 and a modulation factor m is 1.27.

In the square wave control mode, the amplitude of voltage impressed on the AC motor 2 is fixed, so that "a torque feedback control" is performed by a phase control of the square wave voltage pulse based on a difference between a torque estimated value and a torque command value.

Figures 3, 4:
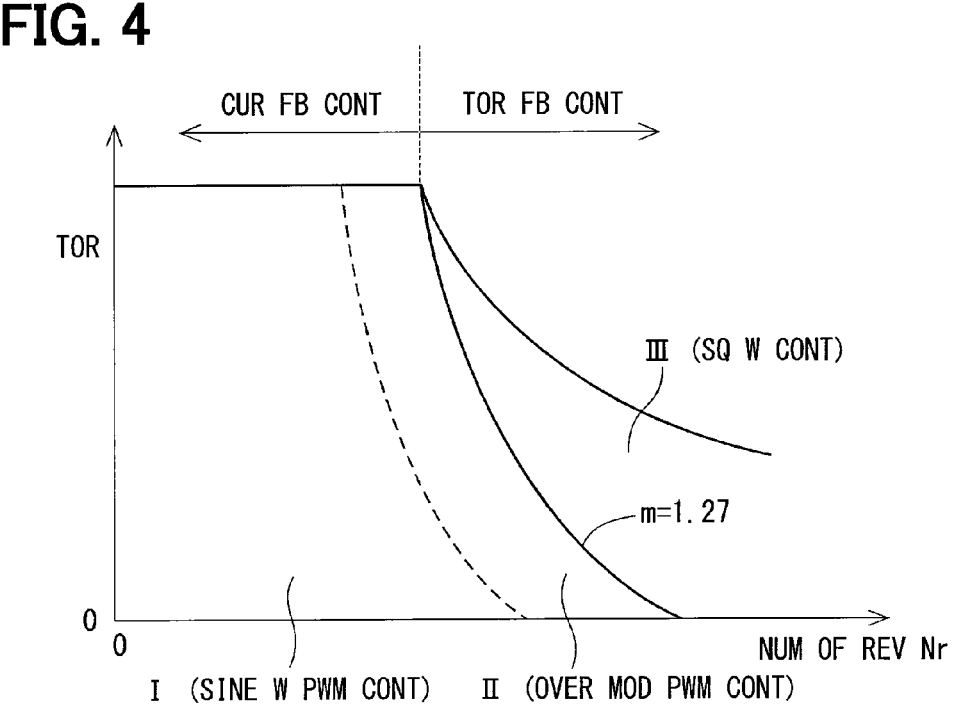
FIG. 3 is a diagram to conceptually illustrate a control mode of an AC motor.
FIG. 4 is a diagram to show a correspondence relationship between a moving state and a control mode of an AC motor.

FIG. 4 shows a correspondence relationship between a moving state of the AC motor 2 and the control modes described above.

In the AC motor 2, when the number of revolutions and an output torque are increased, an induced voltage becomes higher and hence a motor requiring voltage required to drive a motor becomes higher. Hence, the system voltage VH, which is booted by the boost converter and is inputted to the inverter 12, needs to be set higher than the motor requiring voltage. Then, preferably, by switching the control mode from the sine wave PWM control mode to the overmodulation PWM control mode and further from the overmodulation PWM control mode to the square wave control mode at the maximum value of the system voltage VH, the modulation factor m is enhanced.

As shown schematically in FIG. 4, in a range I in which the number of revolutions is low is used the sine wave PWM control mode so as to reduce a torque variation, and in a range II in which the number of revolutions is middle is used the overmodulation PWM control mode, and in a range III in which the number of revolutions is high is used the square wave control mode. In particular, by using the square wave control mode, the output of the AC motor 2 can be enhanced.

The present disclosure does not have a feature specific to the overmodulation PWM control mode, so that a reference to the overmodulation PWM control mode will be omitted in the following description.

[Construction and Operation and Effect of Control Section]

Hereinafter, the construction and the operation and effect of the control section 15 will be described for each embodiment. A first embodiment to a sixth embodiment correspond to "a construction in which the current sensors are provided in two phases", whereas a seventh embodiment and an eighth embodiment correspond to "a construction in which the current sensor is provided in only one phase". In the descriptions of a control block diagram and the like of the following embodiments, the substantially same constructions as those in the first embodiment are denoted by the same reference symbols and their descriptions will be omitted.

First, in the first embodiment to the sixth embodiment in which the current sensors are provided in two phases, a control section 151 (FIG. 5) of the first embodiment to the fourth embodiment and a control section 152 (FIG. 14) of the fifth embodiment correspond to the current feedback control system, whereas a control section 153 (FIG. 17) of the sixth embodiment corresponds to a square wave control mode of the torque feedback control system.

First Embodiment

The construction of the control section 151 corresponding to the current feedback control system will be described with reference to FIG. 5 which is an entire control block diagram and FIG. 6 which is a detailed diagram of an rφ transformation part 27.

A current command operation part 21 operates a d axis current command id* and a q axis current command iq* in a rotating coordinate system (dq coordinate system) of the AC motor 2 on the basis of a torque command value trq* acquired from the vehicle control circuit 9. Hereinafter, "a d axis current and a q axis current" are denoted by "dq axis currents".

In the present embodiment, the dq axis current command values id*, iq* are operated by referring to a map stored in advance, but the other embodiment may be constructed in such a way that the dq axis current command values id*, iq* are operated from a mathematical formula or the like.

A d axis current subtracter 221 calculates a d axis current deviation ΔId that is a difference between a d axis current calculated value Id, which is fed back from a (three phases→two phases) transformation part 45, and a d axis current command value Id*.

A q axis current subtracter 222 calculates a q axis current deviation ΔId that is a difference between a q axis current calculated value Iq, which is fed back from a (three phases→two phases) transformation part 45, and a q axis current command value Iq*.

A d axis PI operation part 231 calculates a feedback term Vd_fb of the d axis voltage command by a PI operation in such a way that the d axis current deviation ΔId converges to 0.

A q axis PI operation part 232 calculates a feedback term Vq_fb of the q axis voltage command by a PI operation in such a way that the q axis current deviation ΔIq converges to 0.

On the other hand, feed-forward terms Vd_ff, Vq_ff of the dq axis voltage commands operated by a feed-forward term operation part 24 are added to the feedback terms Vd_fb, Vq_fb, whereby dq axis voltage commands Vd*, Vq* are calculated.

A (two phases→three phases) transformation part 25 transforms the dq axis voltage commands Vd*, Vq* to three-phase voltage commands Vu*, Vv*, Vw* on the basis of the electric angle θ acquired from the rotation angle sensor 14.

A voltage duty transformation part 26 transforms the voltage commands Vu*, Vv*, Vw* of the respective phases to command duties Du, Dv, Dw by equations (2. 1) to (2. 3) on the basis of the electric angle θ, a phase difference φq calculated by the rφ transformation part 27, and the modulation factor m acquired from a multiplier 28.

$$Du = 0.5 + 0.5 \times m \times \cos(\theta + \phi q + 90°) \quad (2.1)$$

$$Dv = 0.5 + 0.5 \times m \times \cos(\theta + \phi q - 30°) \quad (2.2)$$

$$Dw = 0.5 + 0.5 \times m \times \cos(\theta + \phi q + 210°) \quad (2.3)$$

Figure 6:
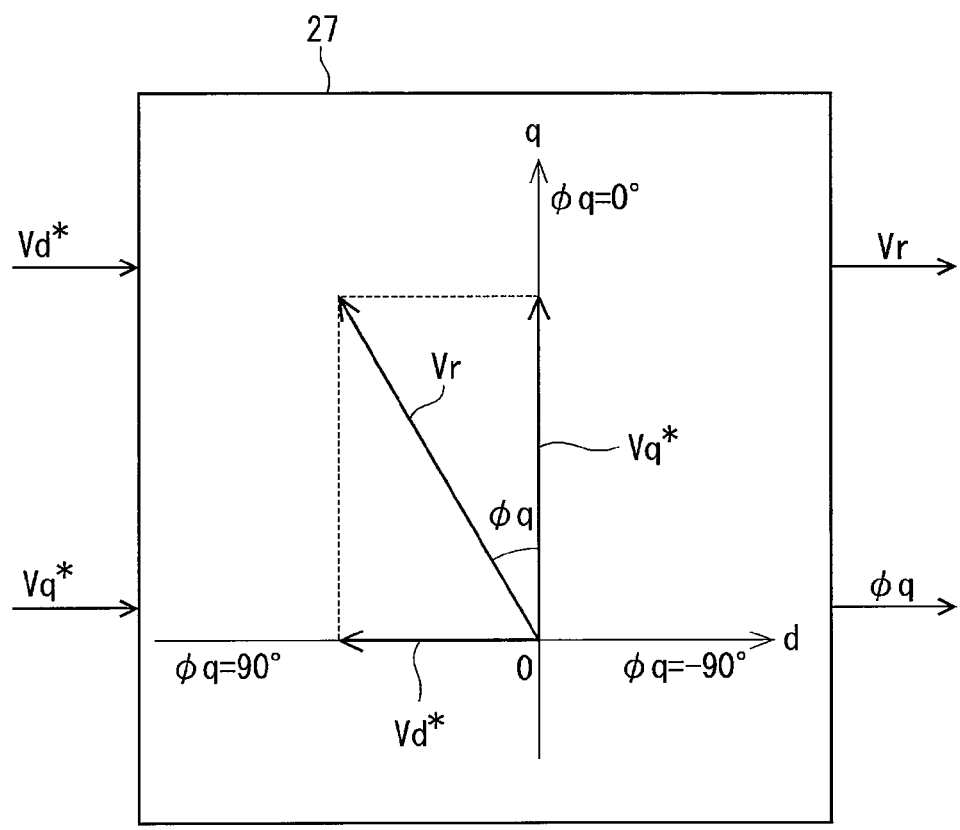
FIG. 6 is a diagram to illustrate a command voltage vector in dq axis coordinates.

On the other hand, as shown in FIG. 6, the rφ transformation part 27 transforms the dq axis voltage commands Vd*, Vq* to a command voltage vector "having a magnitude Vr and having the phase difference φq with the q axis as a base" on a dq– coordinate plane. Here, the phase difference φq is defined in such a way that a counter clockwise direction from the q axis is positive.

The multiplier 28 calculates the modulation factor m of the inverter 12 by the equation (1) on the basis of the system voltage VH and the magnitude Vr of the voltage vector calculated by the rφ transformation part 27.

A PWM signal generation part 29 calculates PWM signals UU, UL, VU, VL, WU, WL relating to the switching elements of the inverter 12 on the basis of the command duties Du, Dv, Dw. Then, the switching on or off of the switching elements of the inverter 12 is controlled on the basis of the PWM signals UU, UL, VU, VL, WU, WL, whereby three-phase AC voltages Vu, Vv, Vw are generated. When the three-phase AC voltages Vu, Vv, Vw are impressed on the AC motor 2, the drive of the AC motor 2 is controlled in such a way that torque responsive to the torque command trq* is outputted.

Next, as to the construction of a feedback system, first, the (three phases→two phases) transformation part 45 will be described.

The (three phases→two phases) transformation part 45 dq transforms "current values reflecting phase currents" of two phases, which are inputted, to dq axis current calculated values Id, Iq on the basis of electric angle θ acquired from the rotation angle sensor 14. The "current values reflecting phase currents", as will be described later, is either first order current values or phase current sensed values. Here, dq transformation based on the current values of two phases will be described. First, a general equation of the dq transformation will be shown in the following equation (3. 1).

[Mathematical formula 2]

$$\begin{bmatrix} Id \\ Iq \end{bmatrix} = \sqrt{\frac{2}{3}} \begin{bmatrix} \cos(\theta) & \cos(\theta - 120°) & \cos(\theta + 120°) \\ -\sin(\theta) & -\sin(\theta - 120°) & -\sin(\theta + 120°) \end{bmatrix} \begin{bmatrix} Iu \\ Iv \\ Iw \end{bmatrix} \quad (3.1)$$

In contrast to this, in the case where current values Iv, Iw of the V phase and the W phase are dq transformed, by substituting "Iu=−Iv−Iw" into the equation (3. 1) from the Kirchhoff's law, an equation (3. 2) can be acquired.

[Mathematical formula 3]

$$\begin{bmatrix} Id \\ Iq \end{bmatrix} = \sqrt{\frac{2}{3}} \begin{bmatrix} \cos(\theta - 120°) - \cos(\theta) & \cos(\theta + 120°) - \cos(\theta) \\ -\sin(\theta - 120°) + \sin(\theta) & -\sin(\theta + 120°) + \sin(\theta) \end{bmatrix} \begin{bmatrix} Iv\_sns \\ Iw\_sns \end{bmatrix} \quad (3.2)$$

$$= \sqrt{\frac{2}{3}} \times \sqrt{3} \begin{bmatrix} -\cos(\theta + 30°) & \cos(\theta + 150°) \\ \sin(\theta + 30°) & -\sin(\theta + 150°) \end{bmatrix} \begin{bmatrix} Iv\_sns \\ Iw\_sns \end{bmatrix}$$

$$= \sqrt{2} \begin{bmatrix} -\sin(\theta + 120°) & \sin(\theta - 120°) \\ -\cos(\theta + 120°) & \cos(\theta - 120°) \end{bmatrix} \begin{bmatrix} Iv\_sns \\ Iw\_sns \end{bmatrix}$$

Subsequently, the constructions of first order current operation parts 411, 412, which are specific to the present embodiment, will be described. The phase current sensed values Iv_sns, Iw_sns sensed by the current sensors 17, 18 have higher order components superimposed thereon or have the center values of current amplitudes offset from the startup of the device in some cases.

When the dq axis current calculated values Id, Iq acquired by dq transforming the phase current sensed values having higher order components superimposed thereon are fed back, the command duties Du, Dv, Dw of the respective phases, which are acquired as the result of the current feedback control, also have higher order components superimposed thereon, which results in superimposing higher order components in noise components such as switching noises or the like of the inverter 12. This is not preferable in the aspect of silence. In particular, in an overmodulation range, the PWM pulse contains higher order components and hence presents a problem such that higher order components are easily superimposed on the phase current sensed values and that noises becomes large.

Further, when the phase current is offset, electric first-order torque variation and power variation are caused. In the electric motor control device 10 mounted in the vehicle like the present embodiment, the torque variation vibrates the vehicle and hence is not desirable. Further, the power variation varies a power source current and a power source voltage and hence is not desirable from the viewpoint of protecting parts.

In this regard, the offset of the phase current is mainly caused by the temperature characteristics of a circuit for receiving output signals of the current sensors 17, 18, and the amount of offset tends to gradually become larger as the driving is continued.

Then, the first order current operation parts 411, 412 respectively expand the current sensed values Iv_sns, Iw_sns in Fourier series and extract first order components of the Fourier series to thereby make the first order components first order currents Iv1s, Iw1s and output the first order currents Iv1s, Iw1s to the (three phases→two phases) transformation part 45.

An operation processing of the V phase first order operated value Iv1s and the W phase first order operated value Iw1s by the first order current operation parts 411, 412 will be described in the following. Since the operation processing of the V phase is the same as the operation processing of the W phase, the V phase relating to the current sensor 17 and the first order current operation part 411 will be described, and the description of the W phase relating to the current sensor 18 and the first order current operation part 412 will be omitted.

First, a general equation of Fourier series expansion will be shown in equations (4. 1) to (4. 3). Here, it is assumed that letters [k], [n] in the equations (4. 1) to (4. 3) are used independently only for these equations and are different from letters [k], [n] used in the other places.

[Mathematical formula 4]

$$f(\theta) = \frac{a_0}{2} + \sum_{k=1}^{\infty} (a_k \cos k\theta + b_k \sin k\theta) \quad (4.1)$$

$$a_n = \frac{1}{\pi} \int_{-\pi}^{\pi} f(\theta) \cos(n\theta) d\theta, (n = 0, 1, 2, ...) \quad (4.2)$$

$$b_n = \frac{1}{\pi} \int_{-\pi}^{\pi} f(\theta) \sin(n\theta) d\theta, (n = 1, 2, 3, ...) \quad (4.3)$$

$f(\theta)$ is a periodic function having $\theta$ as a variable and having a period of $2\pi$ and is expressed by the sum of trigonometric functions. Further, n-th order Fourier coefficients of a cosine function and n-th order Fourier coefficients of a sine function are found by dividing the integration of "$f(\theta) \cos (n\theta)$" and "$f(\theta) \sin (n\theta)$" from $-\pi$ to $\pi$ by $\pi$, respectively.

Here, "the V phase current Iv as a function of the electric angle $\theta$" is applied to $f(\theta)$. ($a_0/2$) that is a 0-th order component in the equation (4. 1) corresponds to the offset amount of the center value of the current amplitude with respect to a current 0 [A]. When the 0-th order component and higher order components of second or more orders are excluded and only first order component is extracted, equations (5. 1) to (5. 3) can be obtained.

[Mathematical formula 5]

$$I_{v1s}(\theta) = a_1 \cos\theta + b_1 \sin\theta \quad (5.1)$$

$$a_1 = \frac{1}{\pi} \int_{-\pi}^{\pi} I_v(\theta) \cos\theta d\theta \quad (5.2)$$

$$b_1 = \frac{1}{\pi} \int_{-\pi}^{\pi} I_v(\theta) \sin\theta d\theta \quad (5.3)$$

In this way, first order Fourier coefficients $a_1$, $b_1$ are calculated by the use of the equations (5. 2) and (5. 3) and are substituted into the equation (5. 1), whereby the V phase first order current operated value Iv1s at the electric angle $\theta$ can be calculated. An integration calculation in each of the equations (5. 2) and (5. 3) is replaced by the integration, that is, the calculation of $\Sigma$ based on a finite number of sensed values. In the present embodiment, by setting an interval of integration at one period of an electric angle of 0 to 360[°] and by dividing the one period by N, "N integral angles" are set in which the integration is performed. In the case where the divided electric angle $\theta$ is made the integral angle, the n-th integral angle is designated by $\theta$ [n], where n is a natural number from 1 to N.

Hereinafter, a letter [n] is used in the meaning of n-th of the integral angles which are set by N in the one period of the electric angle. Further, a timing corresponding to the integral angle $\theta$ [n] on a time axis is referred to as "an integration timing t [n]".

Hereinafter, as to the setting of the integral angle, a plurality of embodiments including the first embodiment will be described. When the outline is described in the first place, the respective embodiments are divided by the following conditions (A), (B), and (C). Detailed descriptions will be given in the respective embodiments.

(A) Whether a divided electric angle $\theta$ is made an integral angle $\theta$ [n] or a divided phase angle ($\theta+\phi q$) is made an integral angle ($\theta+\phi q$) [n].

(B) Whether an interval of consecutive integral angles is not constant or constant, in other words, the one period of the electric angle is unequally divided or equally divided.

(C) Whether a sampling timing of the current sensor 17 is synchronous with an integration timing or not.

In the first embodiment, an example in which: (A) a divided electric angle $\theta$ is made an integral angle $\theta$ [n]; (B) an interval of consecutive integral angles is not constant; and (C) a sampling timing of the current sensor 17 is synchronous with an integration timing will be described with reference to FIGS. 7A and 7B and FIG. 8. As to the condition (A), in the case where a d axis voltage command Vd* is 0 in a command voltage vector (see FIG. 6) or where a phase difference $\phi q$ does not vary in one period of the electric angle in which the integration is performed, the phase difference $\phi q$ in the phase angle ($\theta+\phi q$) can be assumed to be 0 and a divided electric angle $\theta$ can be made an integral angle $\theta$ [n].

Figure 7A:
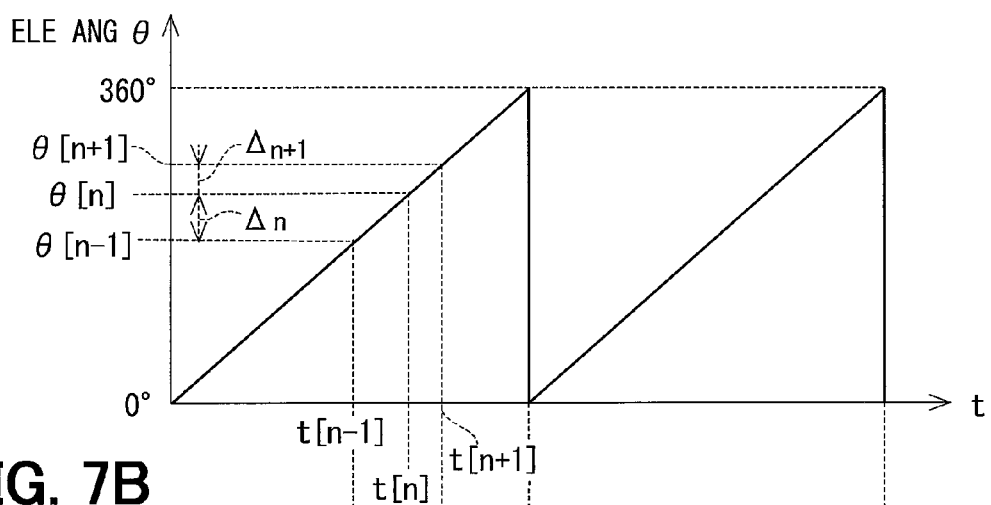
FIGS. 7A and 7B are time charts of a first order current operation according to the first embodiment of the present disclosure.
Figure 7B:
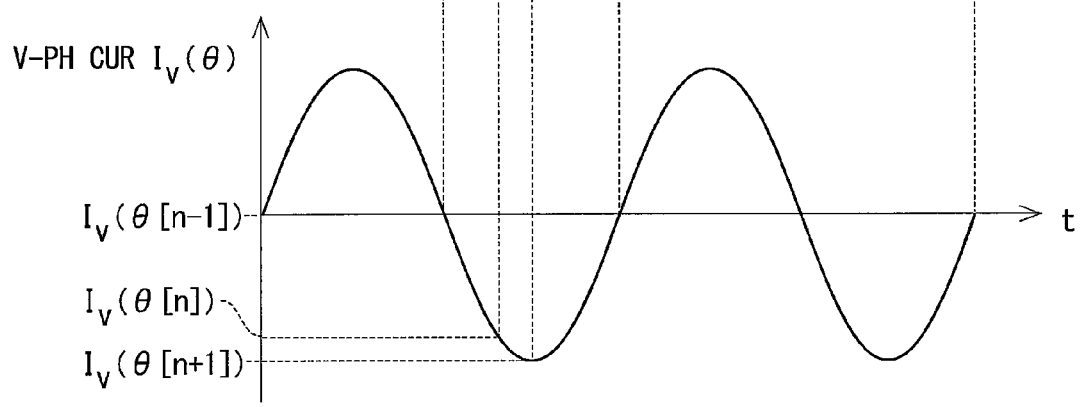

A time chart shown in FIGS. 7A and 7B shows "a time-angle characteristic chart" on an upper side and "a time-current characteristic chart" on a lower side. In the present embodiment, a vertical axis of "the time-angle characteristic chart" is an electric angle $\theta$. The electric angle $\theta$ shows a serrate wave in which: the electric angle increases proportionally to time within a range of 0 to 360[°]; and at the same time when the electric angle reaches 360[°], the electric angle returns to 0[°]. On the vertical axis are shown the [n-1]-th integral angle $\theta$ [n-1], the n-th integral angle $\theta$ [n], and the $\theta$ [n+1]-th integral angle $\theta$ [n+1].

Here, an angle difference $\Delta_n$ between the integral angle $\theta$ [n-1] and the integral angle $\theta$ [n] is not equal to an angle difference $\Delta_{n+1}$ between the integral angle $\theta$ [n] and the integral angle $\theta$ [n+1]. In correspondence to this, intervals of the integration timings t [n-1], t [n], and t [n+1] are not equal to each other.

"The time-current characteristic chart" shows V phase current Iv ($\theta$ [n-1]), Iv ($\theta$ [n]), and Iv ($\theta$ [n+1]) corresponding to the integral angles $\theta$ [n-1], $\theta$ [n], and $\theta$ [n+1].

Since the sampling timing of the current sensor 17 is synchronous with the integration timing, the V phase current sensed value Iv_sns sampled by the current sensor 17 is inputted to the first order current operation part 411 at the integration timing. The first order current operation part 411 operates V phase first order current operated value Iv1s by the use of equations (6. 1) to (6. 3) on the basis of the V phase current Iv (θ) and the electric angle θ over on period of the electric angle from the integral angle θ [0] to the integral angle θ [N].

"Iv (θ [n])×cos (θ [n])×(θ [n]−(θ [n−1])" in the equation (6. 2) and "Iv (θ [n])×sin (θ [n])×(θ [n]−(θ [n−1])" in the equation (6. 3) correspond to "a calculated value based on a phase current sensed value".

[Mathematical formula 6]

$$I_{v1s}(\theta[n]) = a_1 \cos\theta[n] + b_1 \sin\theta[n] \quad (6.1)$$

$$a_1 = \frac{1}{\pi} \sum_{n=1}^{N} I_v(\theta[n]) \cos\theta[n](\theta[n] - \theta[n-1]) \quad (6.2)$$

$$b_1 = \frac{1}{\pi} \sum_{n=1}^{N} I_v(\theta[n]) \sin\theta[n](\theta[n] - \theta[n-1]) \quad (6.3)$$

Figure 8:
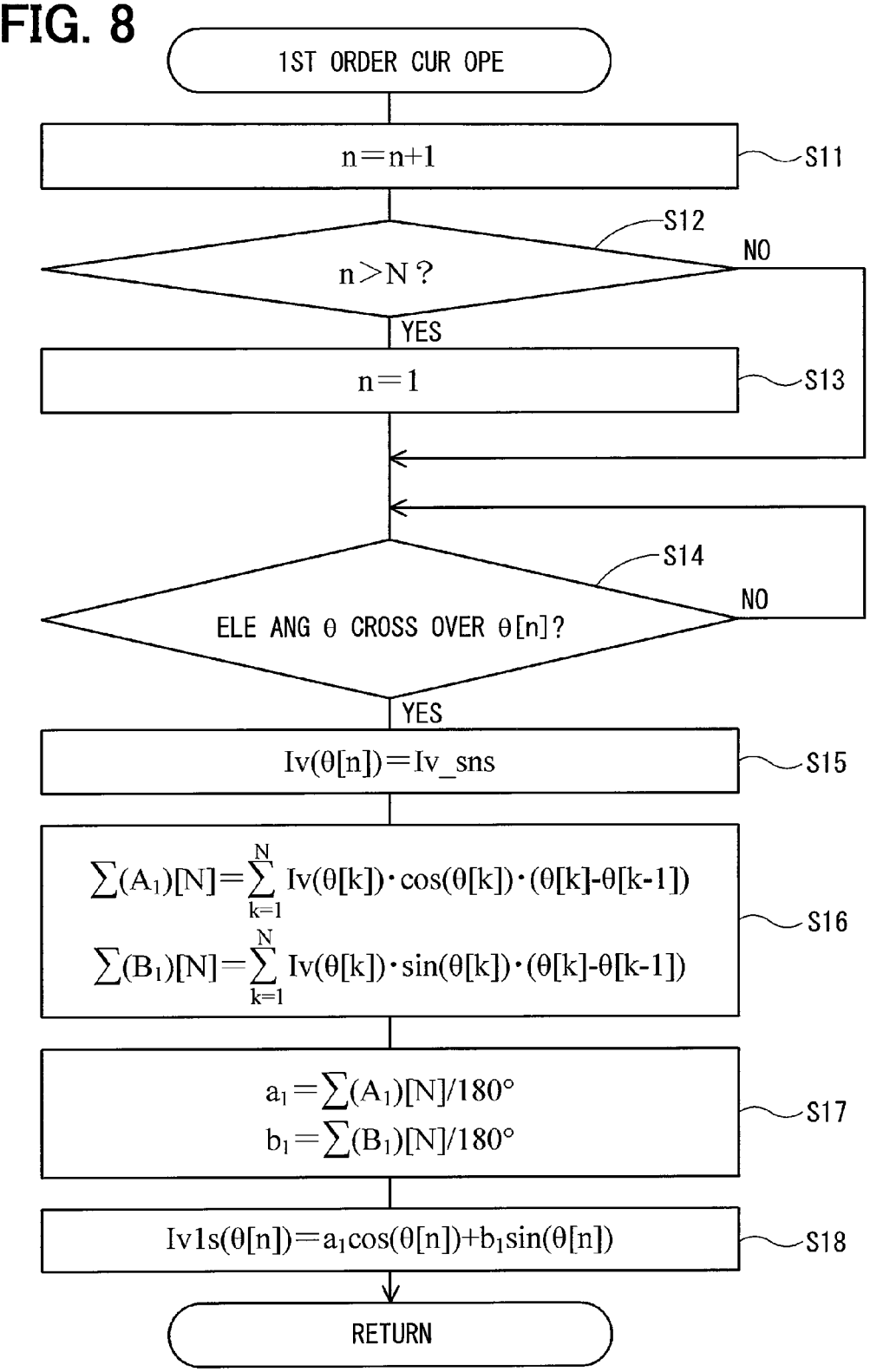
FIG. 8 is a flow chart of a first order current operation processing according to the first embodiment of the present disclosure.

Next, a routine of a first order current operation processing of specifically performing the equations (6. 1) to (6. 3) will be described with reference to a flow chart shown in FIG. 8. In the descriptions of the flow chart, described below, a reference symbol [S] designates a step. Here are used the following equations (6. 2') and (6. 3') of the type in which: a term following E in the equation (6. 2) is put at "Σ($A_1$) [N]"; a term following E in the equation (6. 3) is put at "Σ($B_1$) [N]"; and π is expressed by 180[°] of a degree unit.

$$a_1 = \Sigma(A_1)[N]/180[°] \quad (6.2')$$

$$b_1 = \Sigma(B_1)[N]/180[°] \quad (6.3')$$

In S11, the value of n is incremented by 1 from the value of n of the last processing. In S12 and S13, if n is larger than N, put n=1 and the routine proceeds to S14, whereas if n is not larger than N, the routine proceeds to S14 without performing any processing.

In S14, it is determined whether or not the electric angle crosses "the integral angle θ [n]", in other words, time reaches the integration timing t [n] on the time axis. If the electric angle θ crosses the integral angle θ [n] (S14:YES), the routine proceeds to S15.

In S15, the V phase current sensed value Iv_sns is made the V phase current Iv (θ [n]).

In S16, a product of three terms of a V phase current Iv (θ [k]), a cosine component cos (θ [k]), and a difference of integral angles (θ [k]−(θ [k−1]) at a k-th integral angle θ [k] is integrated from k=1 to k=N, whereby Σ($A_1$) [N] is calculated. Similarly, a product of three terms of a V phase current Iv (θ [k]), a sine component sin (θ [k]), and a difference of integral angles (θ [k]−(θ [k−1]) at a k-th integral angle θ [k] is integrated from k=1 to k=N, whereby Σ($B_1$) [N] is calculated.

In this way, when the Σ($A_1$) [N] and the Σ($B_1$) [N] are calculated, in S17, Fourier coefficients $a_1$, $b_1$ are calculated by the use of the equations (6. 2') and (6. 3'), and next in S18, a V phase first order current operated value Iv1s (θ [n]) is calculated by the use of the equation (6. 1).

Here, one period of the electric angle when the AC motor 2 is driven is continuous to previous one period of the electric angle and hence every time integration is performed at the integral angle θ [n], a total number N of integrated values of Σ($A_1$) [N] and a total number N of Σ($B_1$) [N] can be obtained, the N being a number from (n+1)-th of the last period to n-th of this period.

Hence, every time it is determined that S14 is YES, processings in S15 to S18 are consecutively performed. In this way, the routine of the V phase first order current operation processing by the first order current operation part 411 is finished.

Similarly, a W phase first order current operation processing is performed by the first order current operation part 412.

In this way, the first order current operation parts 411, 412 respectively expand the phase current sensed values Iv_sns, Iw_sns in Fourier series and extract first order components of the Fourier series to thereby make the first order components first order currents Iv1s, Iw1s, so that higher order components of second or more orders and 0-th order direct component are not fed back. Hence, malfunctions caused by the higher order components and the 0-th order component can be prevented.

In the meantime, the malfunctions caused by higher order components superimposed on the phase current and the offset of the phase current present a problem especially in a high rotation range and a high output range. Conversely, the malfunctions do not present a problem comparatively in a low rotation range or in a low output range. In contrast, in the low rotation range, one period of the electric angle for operating the Fourier coefficients and the first order current becomes long and leads to reduce the response of the feedback, so that it is preferable in some cases not to expand the phase current sensed values in Fourier series.

Figure 5:
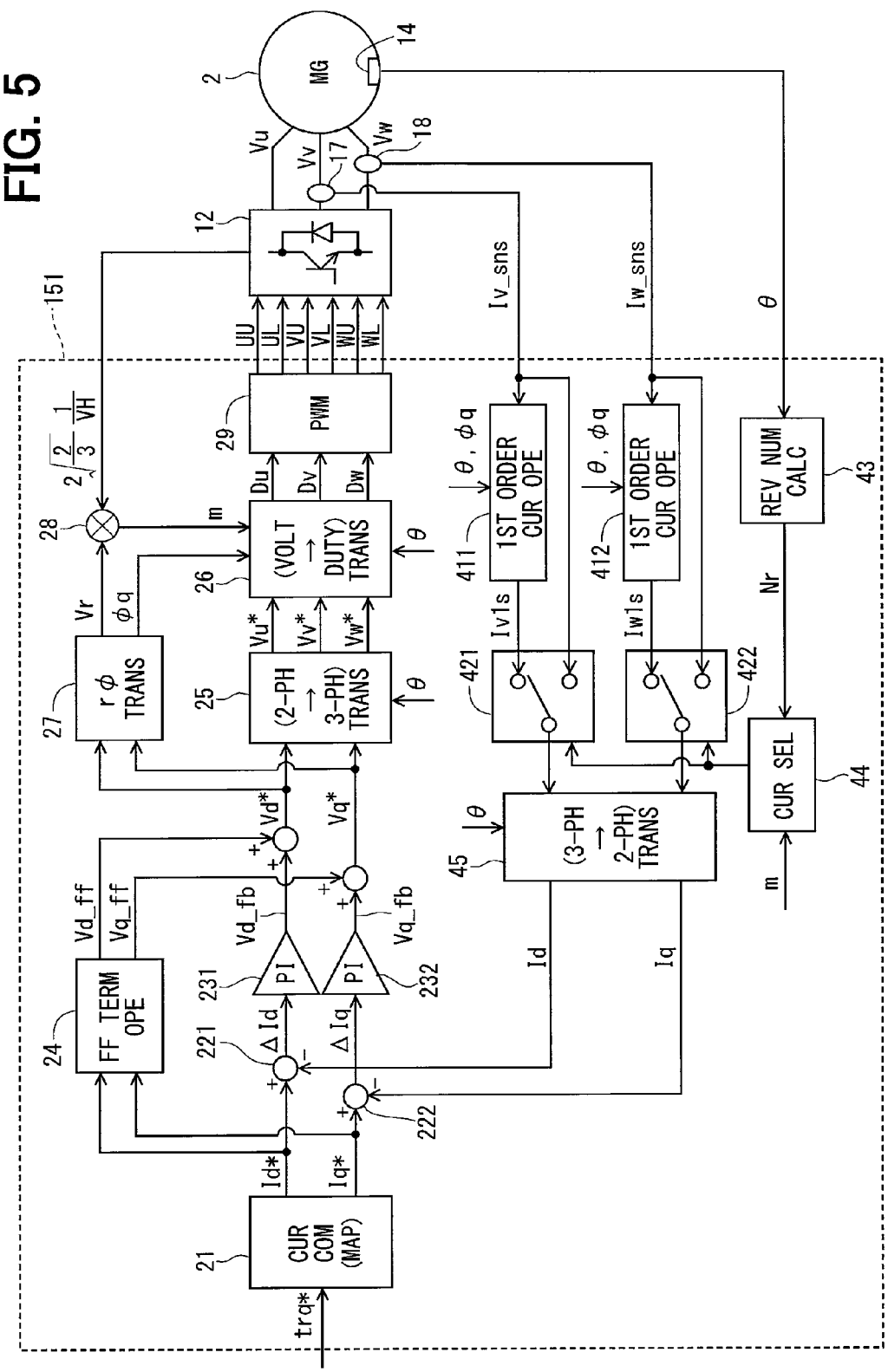
FIG. 5 is a block diagram to show a construction of a control section of the control device of the AC motor according to the first embodiment of the present disclosure.

Then, a control section 151 of the present embodiment further includes current switching parts 421, 422, a number-of-revolutions calculation part 43, and a current selection part 44 as "a current selection means" (see FIG. 5).

For each phase of the V phase and the W phase, the current switching parts 421, 422 switch between the first order current operated values Iv1s, Iw1s by the first order current operation parts 411, 412 and the phase current sensed values Iv_sns, Iw_sns, which do not pass through the first order current operation parts 411, 412, as "current values to be outputted to the (three phases→two phases) transformation part 45" on the basis of the command of the current selection part 44.

When the current switching parts 421, 422 are switched to the first order current operated values Iv1s, Iw1s, there is brought about a Fourier series expansion mode, whereas when the current switching parts 421, 422 are switched to the phase current sensed values Iv_sns, Iw_sns, there is brought about a normal mode.

The current selection part 44 has the number of revolutions Nr and the modulation factor m inputted thereto, the number of revolutions Nr being calculated by the number-of-revolutions calculation part 43 on the basis of the number of poles of the AC motor 2 and the electric angle θ, the modulation factor m being calculated by the multiplier 28.

Figure 9:
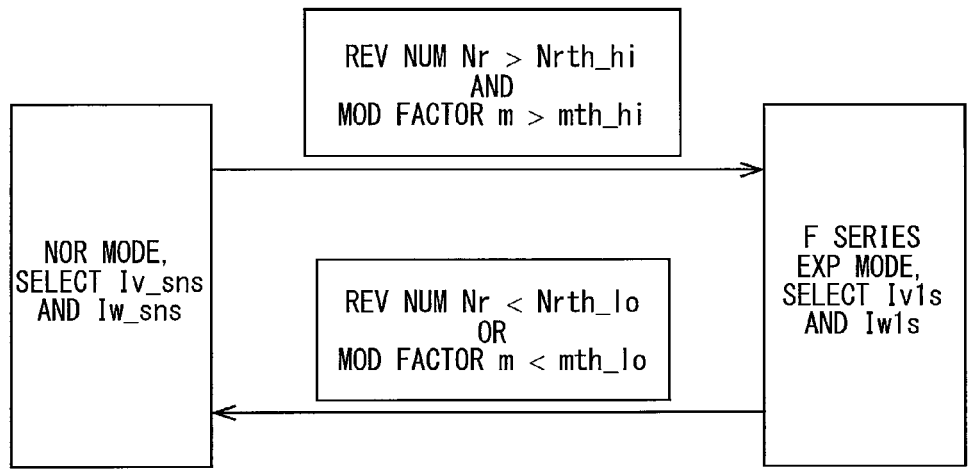
FIG. 9 is a state transition diagram to illustrate switching between a Fourier series expansion mode and a normal mode according to the first embodiment of the present disclosure.
Figure 10:
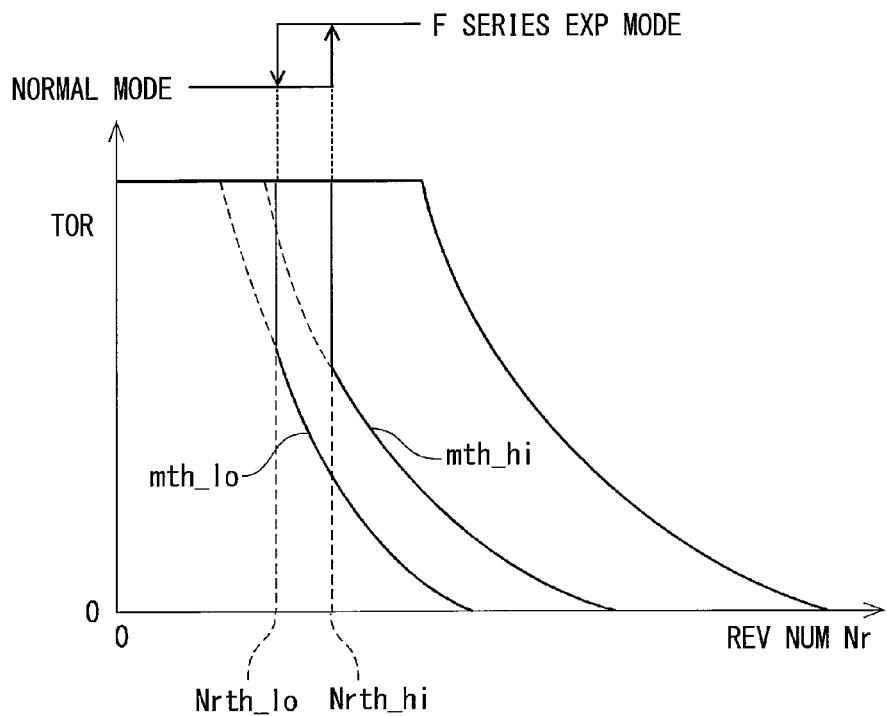
FIG. 10 is a number of revolutions-torque range diagram or a state transition diagram to illustrate switching between the Fourier series expansion mode and the normal mode according to the first embodiment of the present disclosure.

As shown in a state transition diagram of FIG. 9 and a number of revolutions-torque range diagram of FIG. 10, "when the number of revolutions Nr is more than an upper number-of-revolutions threshold value Nrth_hi and the modulation factor m is more than an upper modulation factor threshold value mth_hi", the current selection part 44 switches the normal mode to the Fourier series expansion mode. Further, "when the number of revolutions Nr is less than a lower number-of-revolutions threshold value Nrth_lo and the modulation factor m is less than a lower modulation factor threshold value mth_lo", the current selection part 44 switches the Fourier series expansion mode to the normal mode.

The operation and effect of the electric motor control device 10 having the construction described above will be described.

(1) The first order current operation parts 411, 412 expand the current sensed values Iv_sns, Iw_sns of the V phase and the W phase, which are sensed by the current sensors 17, 18, in Fourier series and extract first order currents Iv1s, Iw1s of the first order components and output the first order currents Iv1s, Iw1s to the (three phases→two phases) transformation part 45. The dq axis current calculated values Id, Iq acquired by dq transforming the first order currents Iv1s, Iw1s by the (three phases→two phases) transformation part 45 are fed back, so that the command duties Du, Dv, Dw of the respective phases generated as the result of the feedback control have higher order components not superimposed thereon. Hence, noises caused by the switching noises of the inverter 12 can be reduced. In particular, in an overmodulation range, the effect of reducing noises can be significantly produced. Further, by removing the direct component of 0-th order component, the offset of the phase current can be corrected and hence the torque variation and the power variation of the AC motor 2 can be suppressed.

In particular, in the AC motor 2 mounted in the electric vehicle such as the hybrid automobile and the electric automobile, a request for silence and drivability is very high and hence the effect of preventing the noises and suppressing the torque variation and the power variation can be significantly produced.

(2) The current selection part 44 switches between the Fourier series expansion mode and the normal mode according to the number of revolutions Nr of the AC motor 2 and the modulation factor m. In this way, the Fourier series expansion of the phase current sensed values can be applied limitedly in the range in which the effect of (1) is significant. On the other hand, in the low rotation range in which the one period of the electric angle becomes long, the Fourier series expansion of the phase current sensed values is not applied, which can prevent a reduction in the response of the feedback control.

(3) In the present embodiment, the divided electric angle θ is made the integral angle θ [n] and the sampling timing of the current sensors 17, 18 is synchronous with the integration timing corresponding to the integral angle θ [n]. In this way, an integration period by the first order current operation parts 411, 412 can be made to correspond with one period of the electric angle, which hence can reduce an operation error.

Subsequently, a second embodiment to a fourth embodiment of the present disclosure will be described with reference to time charts shown in FIG. 11A to FIG. 13C. The second embodiment to the fourth embodiment are different from the first embodiment in any one of the conditions (A), (B), (C) described above and are different from the first embodiment in the calculation equation of the V phase first order current operated values Iv1s (θ [n]) and in the calculation equation of the first order Fourier coefficients $a_1$, $b_1$.

Second Embodiment

Figure 11A:
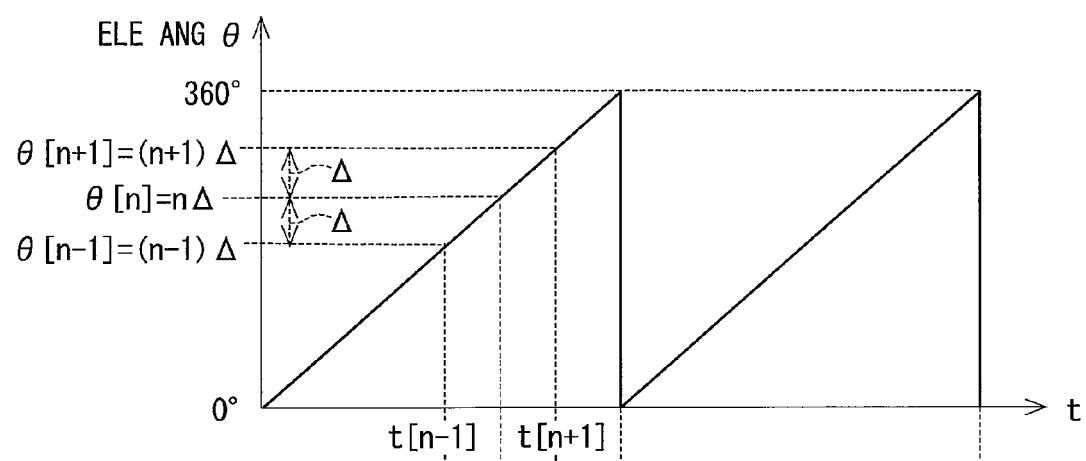
FIGS. 11A and 11B are time charts of a first order current operation according to a second embodiment of the present disclosure.
Figure 11B:
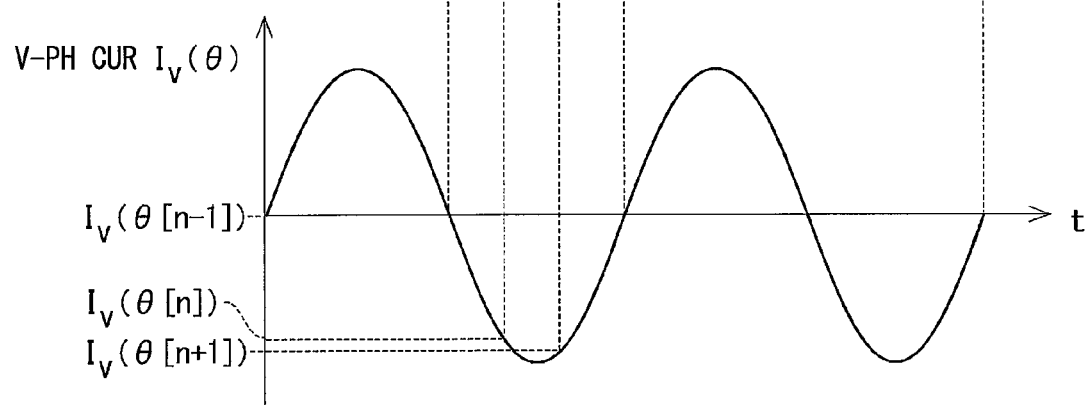

The second embodiment shown in FIGS. 11A to 11C is different from the first embodiment in the condition (B) and has the interval of consecutive integral angles set constant. In other words, the integral angle θ [n] is set at a value obtained by equally dividing one period of the electric angle by N. The interval of consecutive integral angles is set constant, that is, Δ=360[°]/N.

As shown in FIGS. 11A to 11C, an angle difference Δ between the integral angle θ [n−1] and the integral angle θ [n] is equal to an angle difference Δ between the integral angle θ [n] and the integral angle θ [n+1]. In correspondence to this, the intervals of the integration timings t [n−1], t [n], t [n+1] are also equal to each other.

This example is a special case of the first embodiment and hence the equations (6. 1) to (6. 3) can be used as they are. However, simple equations (7. 1) to (7. 3) in which 0 [n] is replaced by (n Δ) can be used instead, which can reduce an operation load.

[Mathematical formula 7]

$$I_{v1s}(\theta[n]) = a_1 \cos(n\Delta) + b_1 \sin\theta(n\Delta) \quad (7.1)$$

$$a_1 = \frac{1}{\pi} \sum_{n=1}^{N} I_v(n\Delta) \cos(n\Delta) \Delta \quad (7.2)$$

$$b_1 = \frac{1}{\pi} \sum_{n=1}^{N} I_v(n\Delta) \sin(n\Delta) \Delta \quad (7.3)$$

For the sake of reference, a specific numerical example will be described. For example, when the number of divisions N is assumed to be 24, the interval Δ of the integral angles becomes 15[°] (=360[°]/24). In the case where the number of poles of the AC motor 2 is 4 and where the number of revolutions is 1500 [rpm], an electric frequency is 100 [Hz] (=1500×4/60) and one period of the electric angle θ becomes 10 [ms]. Hence, the period of integration timing is approximately 400 [μs] (≅10×1000/24). Further, in the case where the number of revolutions is 600 [rpm], the period of the integration timing is approximately 1 [ms], and in the case where the number of revolutions is 6000 [rpm], the period of the integration timing is approximately 100 [μs].

In this way, in the case where the number of divisions N is fixed, the period of the integration timing is varied according to the number of revolutions Nr. Hence, the number of divisions N may be changed according to the number of revolutions Nr of the AC motor 2 or the electric frequency in such a way that the accuracy of integration can be secured. Specifically, as the number of revolutions Nr or the electric frequency is higher, the number of divisions N is made less, whereas as the number of revolutions Nr or the electric frequency is lower, the number of divisions N is made more.

Third Embodiment

Figure 12A:
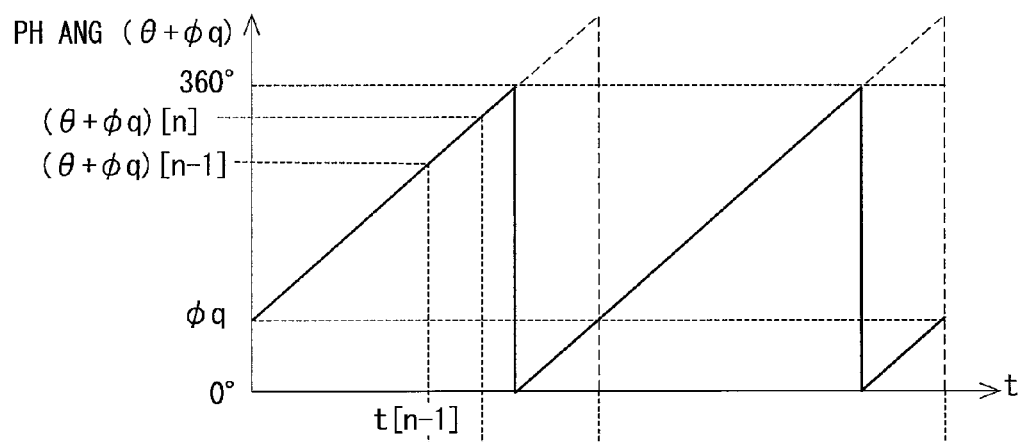
FIGS. 12A and 12B are time charts of a first order current operation according to a third embodiment of the present disclosure.
Figure 12B:
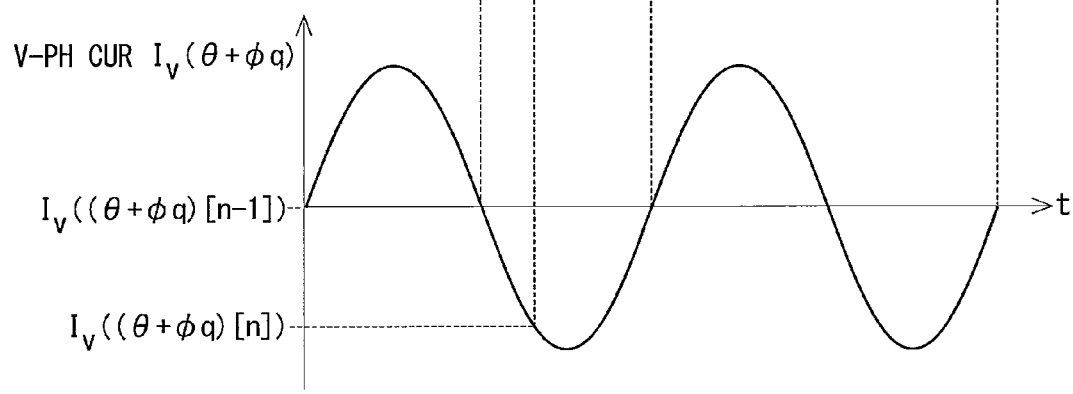

A third embodiment shown in FIGS. 12A and 12B is different from the first embodiment in the condition (A) and has the divided phase angle (θ+φq) made the integral angle (θ+φq) [n]. In the case where in the command voltage vector (see FIG. 6), the d axis voltage Vd* is not 0 and where the phase difference φq is varied in one period of the electric angle in which the integration is performed, the divided phase angle (θ+φq) is set as the integral angle (θ+φq) [n].

Of the third embodiment, a special mode of assuming that the phase difference φq in the phase angle (θ+φq) is 0 corresponds to the first embodiment.

As to the condition (C), the sampling timing of the current sensor 17 is synchronous with the integration timing corresponding to the integral angle (θ+φq) [n]. Further, the vertical axis of "the time-angle characteristic chart" shown in FIGS. 12A and 12B is the phase angle (θ+φq) and "the time-angle characteristic chart" shown in FIGS. 12A and 12B is shown in the shape of a serrate wave which is offset by the phase difference φq with respect to the "the time-angle characteristic chart" shown in FIGS. 7A and 7B. Here, in FIGS. 12A and 12B, the phase difference φq is shown in such a way as to be approximately constant, but the phase difference φq may be changed with time.

In the present embodiment, equations (8. 1) to (8. 3) in which the electric angle θ is replaced by the phase angle (θ+φq) are used for the equations (6. 1) to (6. 3) of the first embodiment.

[Mathematical formula 8]

$$I_{v1s}((\theta + \phi_q)[n]) = a_1 \cos\{(\theta + \phi_q)[n]\} + b_1 \sin\{(\theta + \phi_q)[n]\} \quad (8.1)$$

$$a_1 = \quad (8.2)$$

$$\frac{1}{\pi} \sum_{n=1}^{N} I_v((\theta + \phi_q)[n]) \cos\{(\theta + \phi_q)[n]\}((\theta + \phi_q)[n] - (\theta + \phi_q)[n-1])$$

$$b_1 = \quad (8.3)$$

$$\frac{1}{\pi} \sum_{n=1}^{N} I_v((\theta + \phi_q)[n]) \sin\{(\theta + \phi_q)[n]\}((\theta + \phi_q)[n] - (\theta + \phi_q)[n-1])$$

In this regard, as to the condition (B), in the case where the interval of consecutive integral angles is made constant, it is only necessary to refer to the second embodiment and "to replace (θ+φq) [n] by (nΔ+φq) in the equations (8. 1) to (8. 3)". Here, in FIGS. 12A and 12B, only two points of (θ+φq) [n−1] and (θ+φq) [n] are shown as the integral angles and, for example, it is not specified whether or not the next point (θ+φq) [n+1] appears at an equal interval.

In the third embodiment, the divided phase angle (θ+φq) is made the integral angle (θ+φq) [n] and the sampling timing of the current sensors 17, 18 is synchronous with the integration timing corresponding to the integral angle (θ+φq) [n]. Also in this case, the integration period by the first order current operation parts 411, 412 can be made correspond with one period of the electric angle, which hence can reduce an operation error.

Fourth Embodiment

Figure 13A:
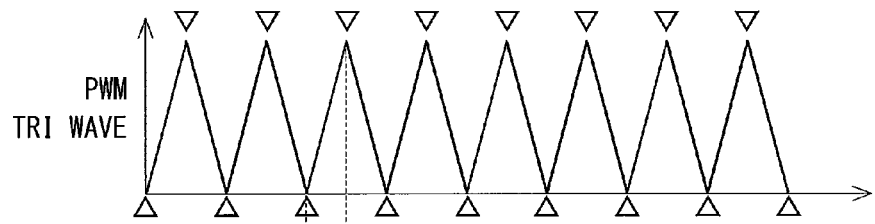
FIGS. 13A to 13C are time charts of a first order current operation according to a fourth embodiment of the present disclosure.
Figure 13B:
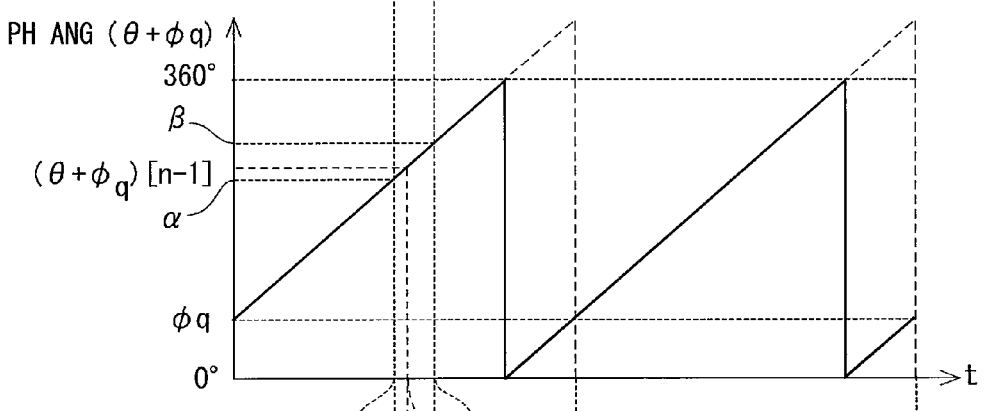
Figure 13C:
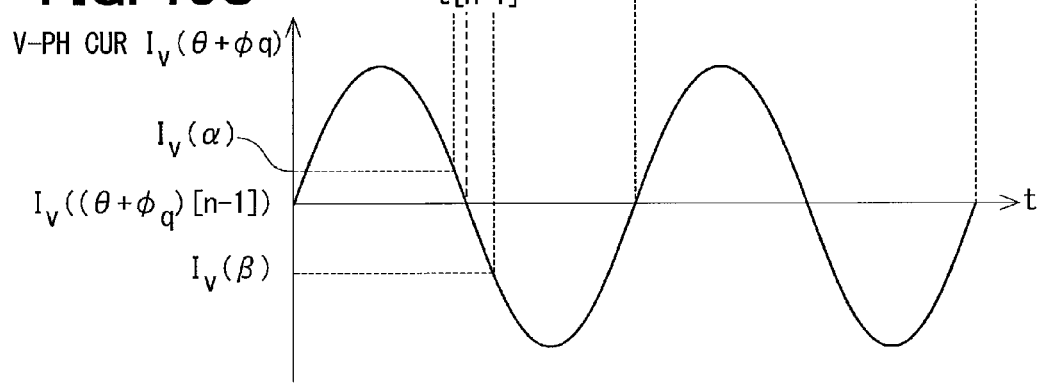

A fourth embodiment shown in FIGS. 13A to 13C is applied to a PWM control mode of a current feedback control type and is different in the condition (C) from the third embodiment in which the divided phase angle (θ+φq) is made the integral angle (θ+φq) [n].

In general, in the PWM control mode, the current is sampled at a timing synchronous with a PWM carrier wave of a given period and a control operation is performed. For example, as shown in FIGS. 13A to 13C, in the case where the timing of a peak and a valley of a triangle wave as a carrier wave is made the sampling timing, the sampling timing is not synchronous with a duty phase angle (θ+φq). Hence, the sampling timing of the current sensor 17 is not synchronous with the integration timing which is set by dividing the duty phase angle (θ+φq).

In this regard, also in the PWM control mode, it is possible to sample the current in synchronization with the duty phase angle (θ+φq).

In the case where the sampling timing is not synchronous with the integration timing, a V phase current value Iv (θ+φq) [n−1] at the integration timing t [n−1] cannot be directly sensed. Hence, attention is paid to a sampling timing t (α) corresponding to a duty phase angle α, which appears just before the integration timing t [n−1], and a sampling timing t (β) corresponding to a duty phase angle β, which appears just after the integration timing t [n−1]. A V phase current value Iv (α) sensed at the sampling timing t (α) and a V phase current value Iv (β) sensed at the sampling timing t (β) are linearly interpolated to thereby estimate a V phase current interpolated value Iv (θ+φq) [n−1] at an integral angle (θ+φq) [n−1]. This processing is referred to as "a before/after linear interpolation processing".

A V phase current linear interpolated value Iv (θ+φq) [n−1] shown in FIGS. 13A to 13C is calculated by the use of an equation (9).

[Mathematical formula 9]

$$I_v((\theta + \phi_q)[n-1]) = \frac{I_v(\beta) - I_v(\alpha)}{\beta - \alpha}((\theta + \phi_q)[n-1] - \alpha) + I_v(\alpha) \quad (9)$$

Even in the case where the sampling timing is not synchronous with the integration timing, an adequate current interpolated value at the integration timing can be acquired by the before/after linear interpolation processing. Moreover, the interpolation is performed on the basis of values at the timing before and after the integration timing, so that the accuracy of the interpolated value can be improved as compared with a case of extrapolation.

Fifth Embodiment

Figure 14:
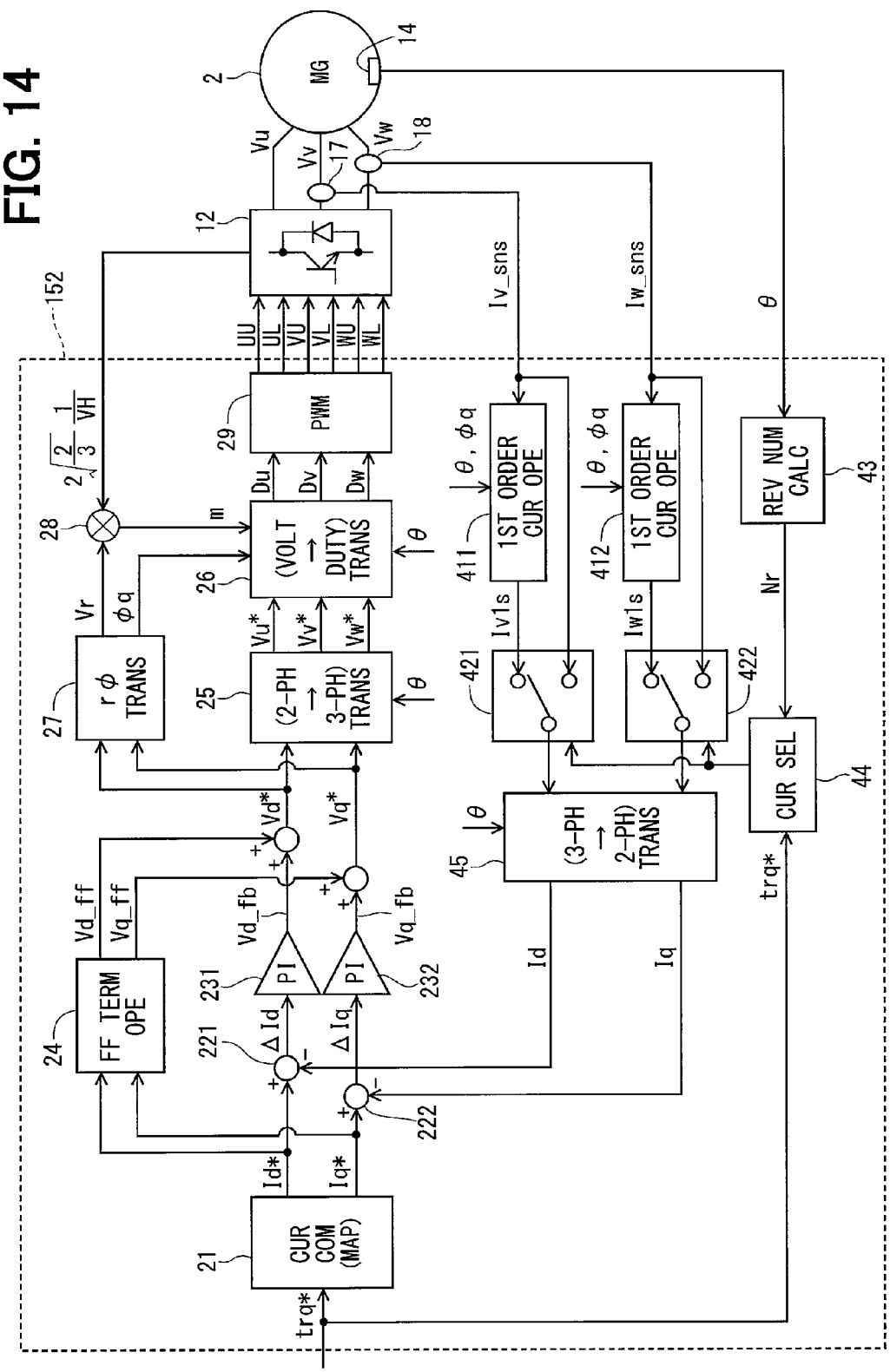
FIG. 14 is a block diagram to show a construction of a control section of a control device of an AC motor according to a fifth embodiment of the present disclosure.

Next, an electric motor control device of a fifth embodiment of the present disclosure will be described with reference to FIG. 14 to FIG. 16. As shown in FIG. 14, a control section 152 of the fifth embodiment is different from the first embodiment in that a torque command value trq* is inputted to a current selection part 44 in place of the modulation factor m. In this way, the current selection part 44 switches between the Fourier series expansion mode and the normal mode according to the number of revolutions Nr and the torque command value trq*.

Figure 15:
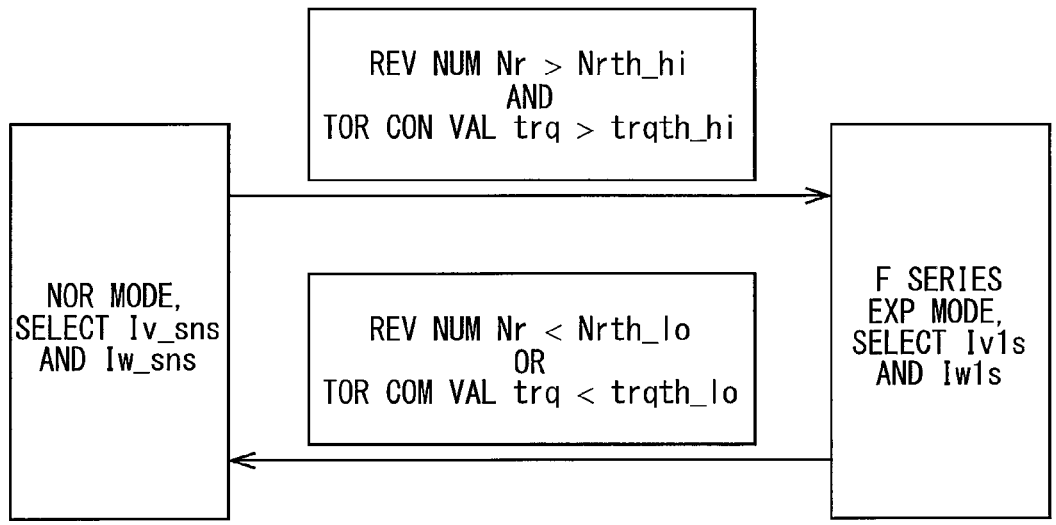
FIG. 15 is a state transition diagram to illustrate switching between a Fourier series expansion mode and a normal mode according to the fifth embodiment of the present disclosure.
Figure 16:
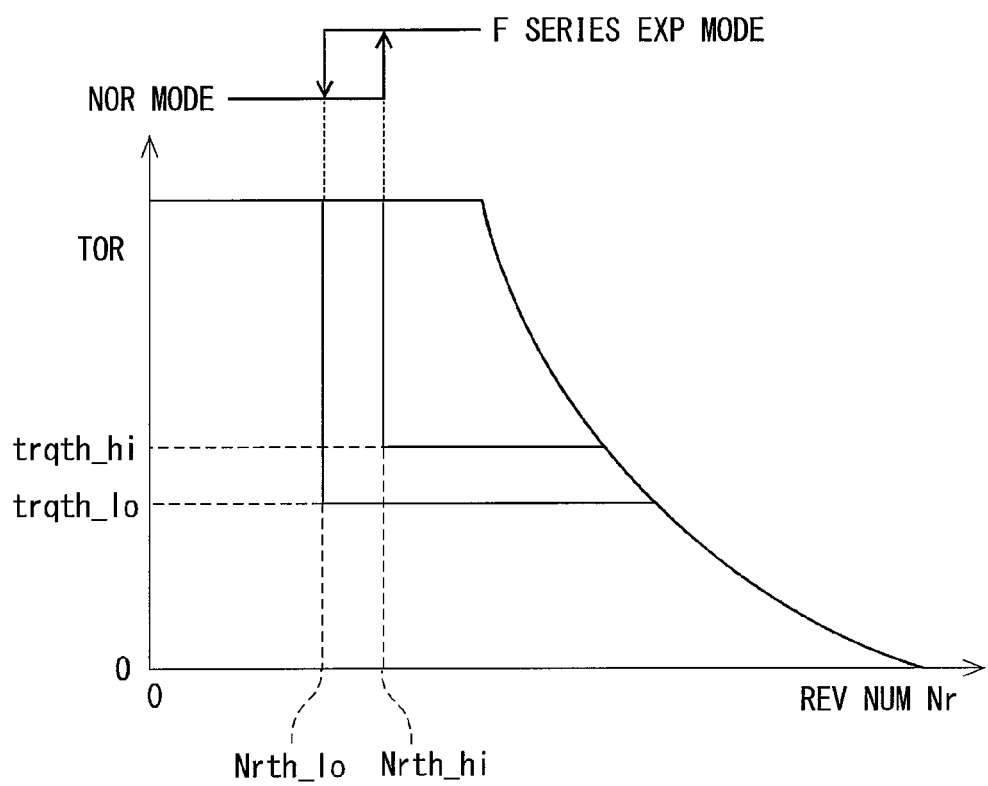
FIG. 16 is a number of revolutions-torque range diagram to illustrate switching between the Fourier series expansion mode and the normal mode according to the fifth embodiment of the present disclosure.

Specifically, in place of FIG. 9 and FIG. 10, a state transition chart shown in FIG. 15 and a number of revolution-torque region diagram shown in FIG. 16 are employed. When "the number of revolutions Nr is more than an upper number-of-revolutions threshold value Nrth_hi and a torque command value trq* is more than an upper torque threshold value trqth_hi, the current selection part 44 switches the normal mode to the Fourier series expansion mode. Further, when "the number of revolutions Nr is less than a lower number-of-revolutions threshold value Nrth_lo and a torque command value trq* is less than a lower torque threshold value trqth_lo, the current selection part 44 switches the Fourier series expansion mode to the normal mode. This can also produce the same effect as the first embodiment.

Sixth Embodiment

Figure 17:
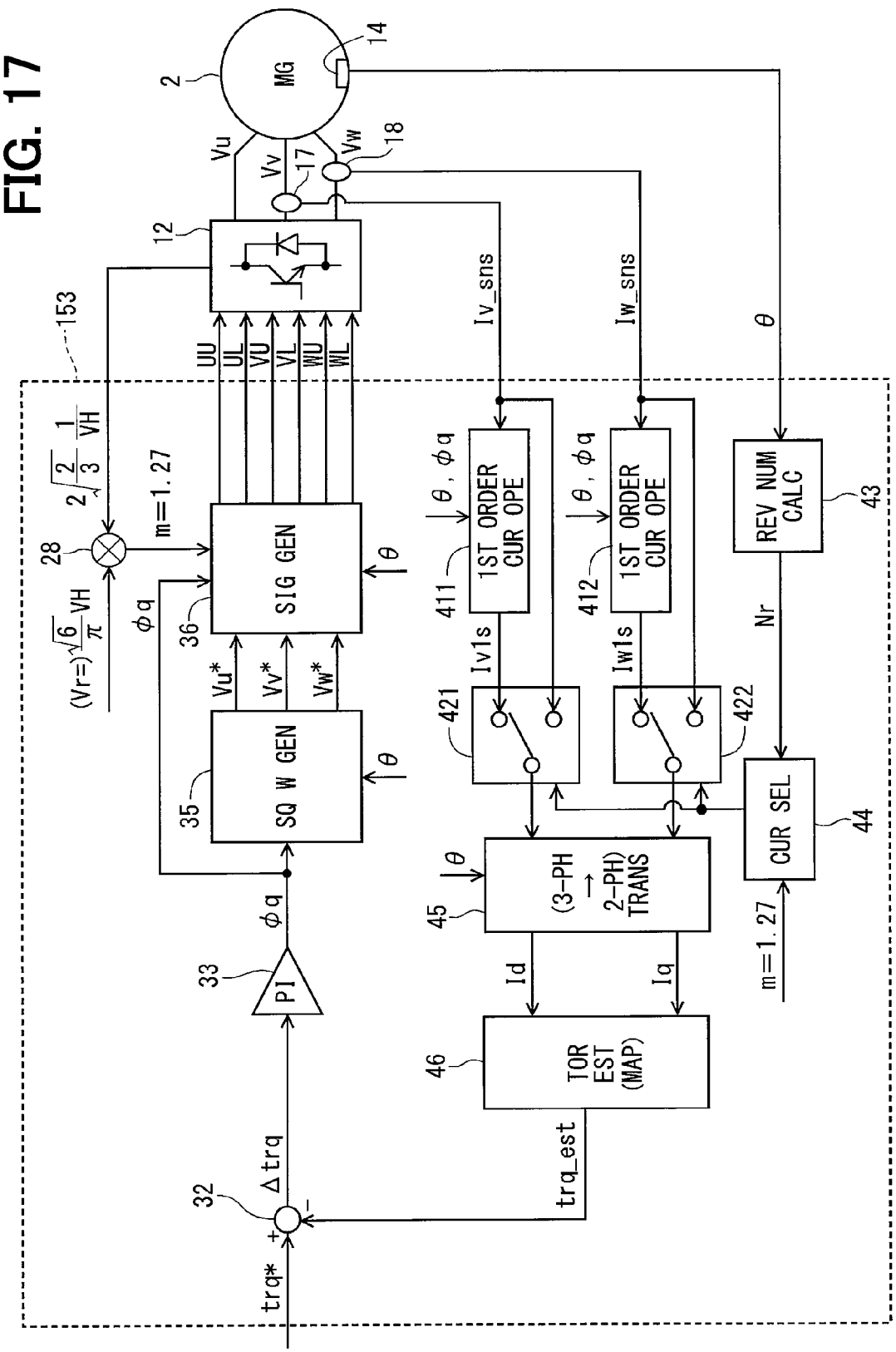
FIG. 17 is a block diagram to show a construction of a control section of a control device of an AC motor according to a sixth embodiment of the present disclosure.

An electric motor control device of a sixth embodiment of the present disclosure will be described with reference to FIG. 17 and FIG. 18. The control sections 151, 152 of the first embodiment to the fifth embodiment drive the inverter 12 by the current feedback control type, whereas a control section 153 of the sixth embodiment shown in FIG. 17 drives the inverter 12 in a square wave control mode of a torque feedback control type.

With reference to FIG. 3 and FIG. 4, as described above, the square wave control mode is a mode which can be effectively utilized in a region in which a high rotation and a high torque are required and which generates a square wave on the basis of a voltage phase command φq without using the current command values Id*, Iq*.

Figure 18:
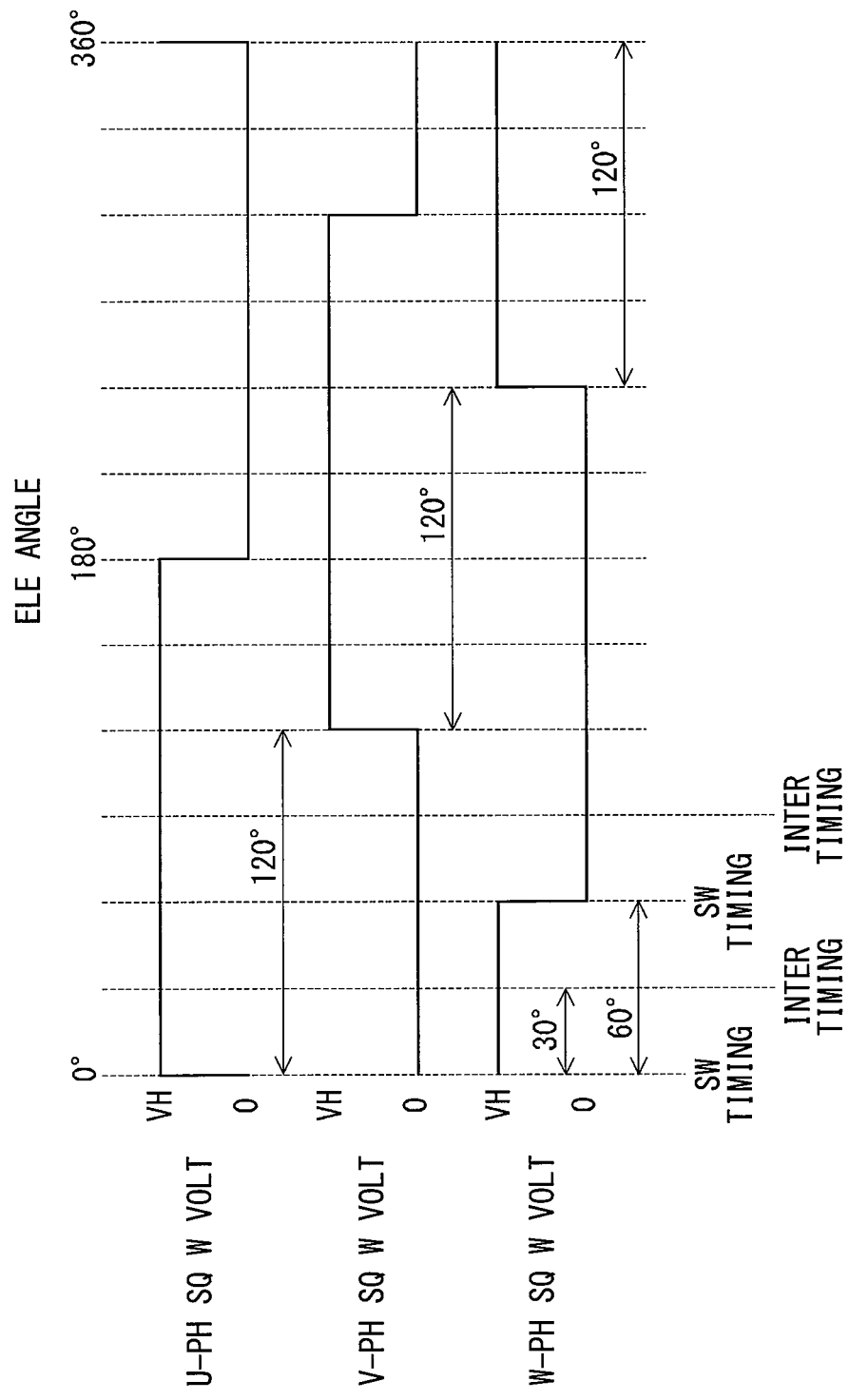
FIG. 18 is a diagram to illustrate a current waveform of a square wave control mode.

As shown in FIG. 18, a voltage waveform of each phase in the square wave control mode is a waveform in which 0 [V] in an off state and a system voltage VH in an on state are switched every 180[°] of phase. The phases of the voltage waveforms of three phases are shifted from each other by 120[°], and the switching element of any one phase of the inverter 12 is switched on and off every 60[°] of electric angle, whereby the voltage waveform is switched on and off.

Timing when the switching element is switched on and off is referred to as "a switch timing". A difference in the electric angle between the consecutive switch timings is 60[°]. Further, in the present embodiment, one "intermediate timing" which is different from the switch timing by 30[°] in the electric angle is set between the consecutive switch timings. However, in the other embodiment, two or more intermediate timings may be set between the consecutive switch timings or the intermediate timing may be not set.

A different point between the control section 153 corresponding to the square wave control mode of the torque feedback type and, in particular, the control section 151 (see FIG. 5) of the current feedback control type will be described. The control section 153 has a torque subtractor 32, a PI operation part 33, a square wave generator 35, a signal generator 36, and a torque estimation part 46.

The torque subtractor 32 calculates a torque deviation Δtrq, which is a difference between a torque estimated value trq_est fed back from the torque estimation part 46, and the torque command value trq*.

The PI operation part 33 calculates a voltage phase command φq by a PI operation in such a way that the torque deviation Δtrq converges to 0 so as to make the torque estimated value trq_est follow the torque command value trq*.

The square wave generator 35 generates a square wave on the basis of the voltage phase command φq and the electric angle θ and outputs a U phase voltage command Vu*, a V phase voltage command Vv*, and a W phase voltage command Vw.

The signal generator 36 generates voltage command signals UU, UL, VU, VL, WU, WL, which relate to the switching on and off of the switching elements of the inverter 12, on the basis of the U phase voltage command Vu*, the V phase voltage command Vv*, and the W phase voltage command Vw and outputs the voltage command signals UU, UL, VU, VL, WU, WL to the inverter 12.

When the switching elements of the inverter 12 are switched on and off on the basis of the voltage command signals UU, UL, VU, VL, WU, WL, three phase AC voltages Vu, Vv, Vw are generated. When the three phase AC voltages Vu, Vv, Vw are applied to the AC motor 2, the drive of the AC motor 2 is controlled in such a way that torque responsive to the torque command value trq* is outputted.

In the square wave control mode, Vr is not operated by rφ transformation from the dq axis voltage commands Vd*, Vq* but "{(√6/π)} VH" is inputted as a fixed Vr value to the multiplier 28. The multiplier 28 calculates a modulation factor m of the square wave control mode by an equation (10). In this way, the modulation factor m of the square wave control mode is a constant.

[Mathematical formula 10]

$$m = \frac{\sqrt{6}}{\pi} VH \times 2 \sqrt{\frac{2}{3}} \frac{1}{VH} \approx 1.27 \quad (10)$$

The control section 153 of the torque feedback control type is the same as the control section 151 of the current feedback control type in that: the current sensed values Iv_sns, Iw_sns of the V phase and the W phase, which are sensed respectively by the current sensor 17, 18, are expanded in Fourier series by the first order current operation parts 411, 412; and the first order currents Iv1s, Iw1s are extracted and in that dq axis current calculated values Id, Iq are calculated by the (three phases→two phases) transformation part 45 on the basis of the first order currents Iv1s, Iw1s and the electric angle θ.

The torque estimation part 46 estimates a torque estimated value trq_est on the basis of the dq axis current calculated values Id, Iq by a map or a mathematical formula and feeds back the torque estimated value trq_est to the torque subtractor 32.

In the present embodiment, the respective switch timings and the intermediate timings shown in FIG. 18 are made the sampling timings by the current sensors 17, 18. For this reason, the sampling timings are synchronous with the electric angle θ and appear 12 times in one period of the electric angle. Hence, the integration processing of the first order current operation parts 411, 412 is performed by the method of the third embodiment with (θ+φq) [n] set as an integral angle.

Further, the control section 153 of the torque feedback control type is the same as the control section 151 of the current feedback control type also in that the current selection part 44 switches between the Fourier series expansion mode and the normal mode according to the number of revolutions Nr and the modulation factor m. However, the modulation factor m is fixedly set at 1.27 in the square wave control mode, so that the current selection part 44 switches between the Fourier series expansion mode and the normal mode according to substantially only the number of revolutions Nr.

Here, in the same way as the fifth embodiment, the current selection part 44 may switch between the Fourier series expansion mode and the normal mode according to the number of revolutions Nr and the torque command value trq*.

In the sixth embodiment to which the square wave control mode is applied, not only the effects of the first embodiment but also the following effects can be produced.

In the square wave control mode of the three phase AC motor, the respective phases are switched on and off one time in one period of the electric angle, that is, six times in total, so that sixth order components synchronous with the switching are superimposed. When this sixth-order components are removed by a low pass filter, a current vector is likely to be excessively smoothed and hence to cause a trouble for recognition. Hence, the gain of the torque feedback control is forcibly reduced, which hence results in reducing torque response.

In this point, the present embodiment does not use a low pass filter so as to remove the sixth order components and hence can avoid a problem of reducing the torque response.

Seventh Embodiment and Eighth Embodiments

Next, a seventh embodiment and an eighth embodiment of the construction in which the current sensor is provided only in one phase will be described with reference to FIG. 19 and FIG. 20. A control section 154 of the seventh embodiment (FIG. 19) corresponds to the current feedback control type, whereas a control section 155 of the eighth embodiment (FIG. 20) corresponds to the square wave control mode of the torque feedback control type.

Different points between the constructions of the control section 154 of the seventh embodiment and the control section 155 of the eighth embodiment and the constructions of the control section 151 of the first embodiment (FIG. 5) and the control section 153 of the sixth embodiment (FIG. 17) will be mainly described.

Figure 19:
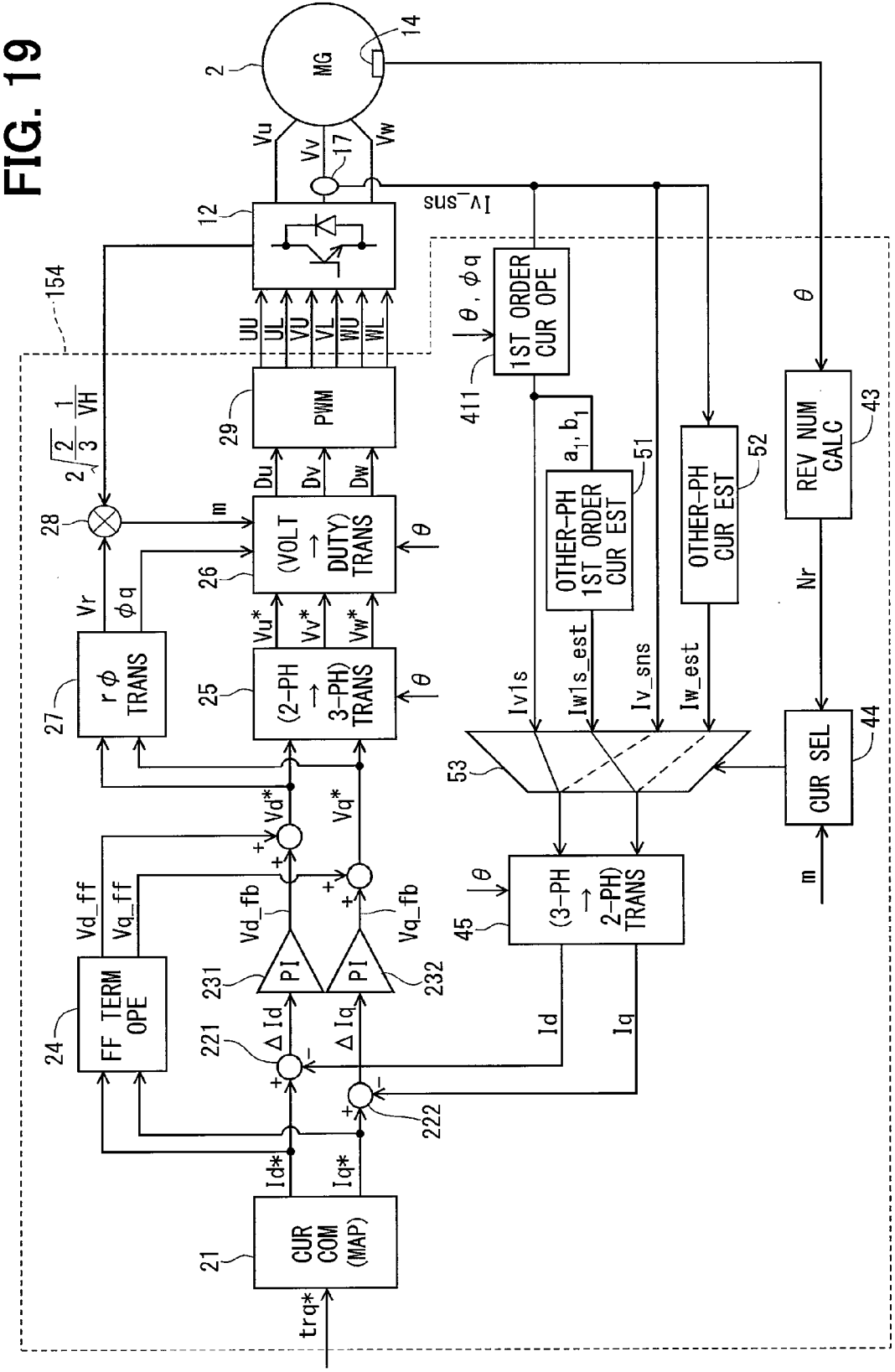
FIG. 19 is a block diagram to show a construction of a control section of a control device of an AC motor according to a seventh embodiment of the present disclosure.
Figure 20:
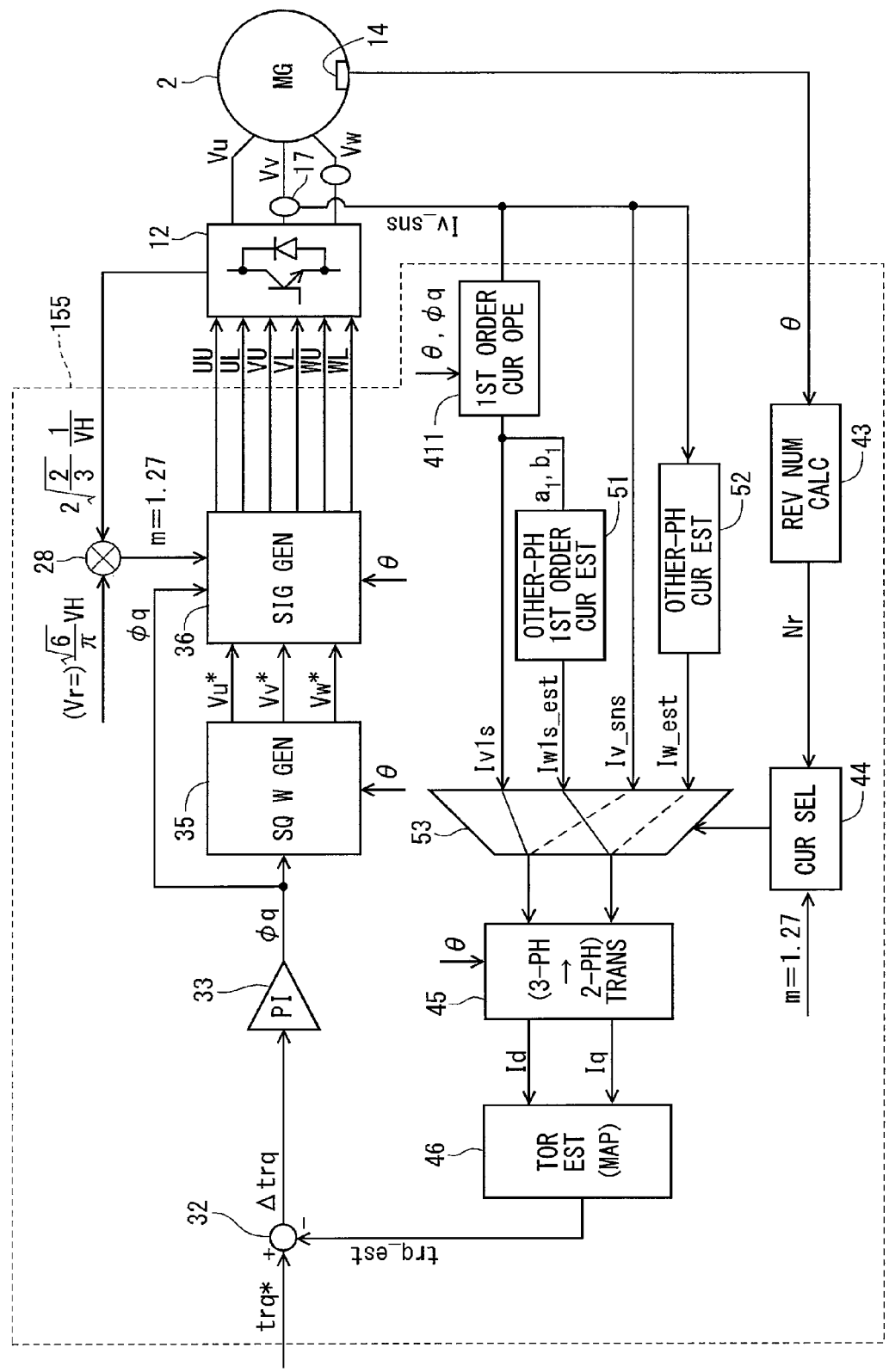
FIG. 20 is a block diagram to show a construction of a control section of a control device of an AC motor according to an eighth embodiment of the present disclosure.

As shown in FIG. 19 and FIG. 20, the first order current operation part 411 expands the current sensed value Iv_sns of the V phase, which is sensed by the current sensor 17, in Fourier series and extracts the first order current Iv1s. The other phase first order current estimation part 51 estimates a first order current estimated vale Iw1s_est of the W phase by the use of an equation (11) on the basis of the Fourier series coefficients $a_1$, $b_1$ relating to the first order current operated value Iv1s of the V phase.

[Mathematical formula 11]

$$I_{w1s}\_est = a_1 \cos(\theta - 120°) + b_1 \sin(\theta - 120°) \quad (11)$$

That is, the first order current estimated value Iw1s_est of the W phase is estimated by the equation that has the same Fourier series coefficients $a_1$, $b_1$ as are operated by the equations (6.2), (6.3) or the equations (7.2), (7.3), (8.2), (8.3), which are alternative equations of the equations (6.2), (6.3), for the first order current operated value Iv1s of the V phase and that is shifted in the electric angle by 120[°], that is, by (⅓) period with respect to the first order current Iv1s of the V phase. In this example, the first order current value at the electric angle (θ−120[°]) of the W phase corresponds to the first order current value at the electric angle θ of the V phase.

In other words, in the present embodiment, the current estimated value of the other phase is estimated not by an operation or a differential operation using a current command value but on the basis of the Fourier coefficients operated from the current sensed value of one phase.

The current selection part 44, like the first to the fourth embodiments and the sixth embodiment, switches between the Fourier series expansion mode and the normal mode according to the number of revolutions Nr and the modulation factor m. A state shown by solid lines in a current switching part 53 shown in FIG. 19 is the Fourier series expansion mode and a state shown by broken lines is the normal mode. In the Fourier series expansion mode, the current selection part 44 selects the first order current operated value Iv1s as the V phase current and selects the first order current estimated value Iw1s_est as the W phase current. On the other hand, in the normal mode, the current selection part 44 selects the phase current sensed value Iv_sns as the V phase current and selects the current estimated value Iw_est, which the other phase current estimation part 52 estimates, as the W phase current.

In this regard, like the fifth embodiment, the switching between the Fourier series expansion mode and the normal mode may be made according to the number of revolutions Nr and the torque command value trq*.

In the normal mode, the other phase current estimation part 52 estimates the current estimated value Iw_est of the W phase by the use of at least the current sensed value Iv_sns of the V phase. A plurality of current estimation methods can be employed as this current estimation method. Some of the current estimation methods will be described in the following. (i) to (iii) are a method using a current command value and (iv) to (vi) are a method not using a current command value. Further, (i) and (ii) are techniques disclosed in the publication of unexamined application and (iii) to (vi) are techniques described in the specifications of an unpublished patent application by the present applicant.

In the following descriptions, of three phases, the phase in which the current sensor is provided is referred to as "a sensor phase" and an example of a sensor phase set in a cited original document will be incorporated. In the case where the respective methods are applied to the present embodiment, it is only necessary to read the sensor phase as the V phase.

In this regard, in the eighth embodiment, the current command value is not generally used in the square wave control mode of the torque feedback control type but the current command value may be generated so as to estimate the current. Hence, the other phase current estimation part 52 of the eighth embodiment is not prevented from employing the methods of (i) to (iii).

(i) Estimation based on a current basic angle, which is based on a current command phase angle, and an amplitude (technique disclosed in JP-A 2004-159391)

When it is assumed that the sensor phase is the U phase, a U phase current sensed value (Iu) is divided by "the current command phase angle obtained by the dq axis current commands and a U phase current basic angle (θ') generated from the electric angle" to thereby calculate a current amplitude (Ia), and a sine value at an electric angle shifted from the U phase current basic angle by ±120[°] is multiplied by the current amplitude (Ia) to thereby calculate the current estimated values Iv, Iw of the other phases (equations 12.1 to 12.3)

$$Ia = Iu / [\sqrt{(1/3)} \times (\{-\sin(\theta')\})] \quad 12.1$$

$$Iv = \sqrt{(1/3)} \times Ia \times (\{-\sin(\theta' + 120[°])\}) \quad 12.2$$

$$Iw = \sqrt{(1/3)} \times Ia \times (\{-\sin(\theta' + 240[°])\}) \quad 12.3$$

(ii) Estimation based on a phase current command value (technique disclosed in JP-A 2008-86139)

Of the three phase current command values obtained by inversely dq transforming the d axis current command value Id* and the q axis command value Iq*, the phase current command values of two phases other than the sensor phase are treated as the current estimated values.

The technique of (i) or (ii) presents a problem such that in particular, in a low rotation range in which an electric angle movement and a current change in a sampling interval are decreased, information reflecting the current sensed value is scare and hence control becomes unstable.

(iii) Estimation based on a sensor phase basic current phase

When it is assumed that the sensor phase is the W phase, an α axis current iα in an α axis direction corresponding with the sensor phase and a β axis current iβ in a β axis direction perpendicular to the sensor phase are operated by the use of a W phase current sensed value iw_sns, at least one of a U phase current command value iu* and a V phase current command value Iv*, and the electric angle θe. Then, a sensor phase basic current phase θx is calculated by an equation (13).

$$\theta x = \tan^{-1}(i\beta/i\alpha) \quad (13)$$

Subsequently, a U phase current estimated value iu_est or a V phase current estimated value iv_est is operated on the basis of the sensor phase basic current phase θx and the W phase current sensed value iw_sns. Then, the W phase current sensed value iw_sns and the U phase current estimated value iu_est or the V phase current estimated value iv_est are dq transformed. In this regard, in the operation of the U phase current estimated value iu_est or the V phase current estimated value iv_est, a correction processing to avoid "the zero multiplication" and "the zero division" may be performed.

(iv) Estimation by Differentiating α Axis Current (iv) is different from (iii) in that the β axis current iβ is operated without using the current command value. By paying attention to that the α axis current iα and the iβ axis current iβ are in the relationship between "a sine wave and a cosine wave" and that a phase difference between the α axis current iα and the β axis current iβ is 90[°], a β axis current estimated value iβ_est is operated on the basis of the α axis current differentiated value Δ iα.

Here, in the case where the operation in the control section is a discrete system, the α axis current differentiated value Δ iα is delayed by a half of an electric angle movement Δθe with respect to an actual β axis current iβ. Taking this in consideration, it is preferable that the β axis current estimated value iβ_est is corrected by a correction amount H obtained by multiplying an average value of the α axis current iα of the last time and this time by a half (Δθe/2) of the electric angle movement (Δθe).

Then, the sensor phase basic current phase θx is operated by the use of the α axis current iα and the β axis current estimated value iβ_est. The subsequent operations are the same as those in (iii).

Specifically in the square wave control mode, the α axis current iα is sampled at each switch timing when the switching element is switched on and off and at each intermediate timing set between consecutive switch timings, and the α axis current differentiated value Δ iα is operated. Hence, in particular, in a high rotation range, an operation frequency is increased and hence a processing load is increased.

(v) Estimation Using a Recurrence Formula

When it is assumed that the sensor phase is the W phase, by using that a W phase axis relatively rotates on the dq coordinates, a W phase estimated error Δiw_est is integrated to make the dq axis current estimated value asymptotic to the dq axis actual current value.

A W phase current basic value iw_bf of a sensor phase component is operated on the basis of the dq axis current estimated values id_est, iq_est of the last time and the electric angle θe of this time, and the W phase estimated error Δiw_est that is a difference between the W phase current basic value iw_bf and the W phase current sensed value iw_sns is calculated.

A corrected error KΔiw_est obtained by multiplying the W phase estimated error Δiw_est by a gain K that is a filter element, and dq axis corrected values id_crr, iq_crr are calculated by the dq transformation on the assumption that Δiu=0 and Δiv=0. The calculated dq axis corrected values id_crr, iq_crr are made a correction vector in a sensor direction and the correction vector is integrated on the d-q coordinate system to thereby operate the dq axis current estimated values id_est, iq_est.

(vi) Operation of Feed Forward Current Command

An operation of a feed forward current command is an operation of operating dq axis voltage commands Vd*, Vq* by the use of voltage equations (14. 1) and (14. 2) based on the dq axis current commands id*, iq* and a machine constant of the AC motor 2 and is effective in a low rotation range in which control by an estimation method using a current command value becomes unstable.

$$Vd^* = Ra \times Id^* + Ld \times (d/dt) \times Id^* - \omega \times Lq \times Iq^* \quad (14.1)$$

$$Vq^* = Ra \times Iq^* + Lq \times (d/dt) \times Iq^* + \omega \times Ld \times Id^* + \omega \times \psi \quad (14.2)$$

Reference characters are as follows.
Ra: armature resistance
Ld, Lq: d axis self-inductance, q axis self-inductance
ω: electric angular velocity
ψ: armature interlinkage flux of permanent magnet In particular, in the low rotation range, when a time differential term (d/dt) expressing a transient property is neglected and it is assumed that the electric angular velocity ω≅0 [rad/s], only an armature resistance Ra term remains as shown by equations (14. 3) and (14. 4). Hence, the dq axis voltage commands Vd*, Vq* can be easily calculated from the dq axis current commands Id*, Iq*.

$$Vd^* = Ra \times Id^* \quad (14.3)$$

$$Vq^* = Ra \times Iq^* \quad (14.4)$$

Up to this point, the descriptions of the current estimation method that can be employed by the other phase current estimation part 52 in the normal mode will be finished.

In this way, in the seventh embodiment and the eighth embodiment, by providing the current sensor 17 in only one phase, the number of current sensors can be decreased as compared with the construction in which the current sensors are provided in two phases or three phases, whereby the construction near the three phase output terminals of the inverter 12 can be reduced in size and the cost of the control system of the AC motor 2 can be reduced.

Then, in the Fourier series expansion mode, the other phase first order estimation part 51 estimates the first order current estimated values of the other phases on the basis of the Fourier coefficients operated from the current sensed value of the one phase without performing an operation or a differential operation using the current command value.

In the Fourier series expansion mode, by employing this estimation method, this current estimation method can be applied even to the case in which the current command value is not used in the square wave control mode of the torque feedback control type. Further, in particular, as compared with the estimation method of performing the differential operation of (iv) described above, this current estimation method can reduce a processing load as the estimation method not using the current command value. Still further, by performing the estimation on the basis of the Fourier coefficients, higher order components superimposed on the phase current can be removed from the other phase for which the current is estimated and the offset of the phase current can be corrected.

Hence, in the electric motor control device 10 of the construction having the current sensor provided only in one phase, the torque variation and the power variation of the AC motor 2 can be suppressed.

Other Embodiments (A) In the first embodiment to the sixth embodiment, the current sensors 17, 18 are provided in two phases of the V phase and the W phase, but the current sensors may be provided in two phases of the U phase and the V phase or the U phase and the W phase. Alternatively, it is also possible to employ the following method: that is, the current sensors are provided in three phases; and the current sensed values of three phases sensed by the current sensors are expanded in Fourier series and then the first order currents are extracted from the Fourier series and the extracted first order currents are dq transformed to thereby calculate the dq axis current calculated values Id, Iq without using the Kirchhoff's law. Further, in the seventh embodiment and the eighth embodiment, the current sensor 17 is provided in the V phase but the current sensor may be provided in the U phase or the W phase.

Still further, in addition to the control current sensor for sensing the current used for the control, an independent monitor current sensor for monitoring an abnormality of the control current sensor may be provided in the same phase as the control current sensor or in a phase different from the control current sensor. Here, the monitor current sensor is excluded from "the current sensor" defined in the present disclosure.

(B) The control section 15 may always perform the Fourier series expansion mode without switching from the Fourier series expansion mode to the normal mode also in the low rotation range of the AC motor 2 or in a range in which the modulation factor m or the torque command value trq* is small.

(C) As to the relationship between the sampling timing of the current sensors 17, 18 and the integration timing by the first order current operation parts 411, 412, the integration timings are not necessarily set at all sampling timings. For example, the integration timing may be set once every few sampling timings. In this case, the frequency of setting the integration timing with respect to the number of times of sampling timings per unit time may be changed according to the number of revolutions Nr in consideration of the balance between an operation accuracy and a processing load.

(D) In the embodiment described above, the description has been made in the following manner: the integration period during which the first order current operation parts 411, 412 operates the Fourier coefficients is assumed to be one period of the electric angle. However, the integration may be performed during k (k: natural number) periods of the electric angle not less than two periods of the electric angle.

(E) The AC motor of the embodiments described above is the three phase AC motor of the permanent magnet synchronous type, but in the other embodiment, the AC motor may be an induction motor or an other synchronous motor. Further, the AC motor of the embodiments described above is the so-called motor generator having both of the function as an electric motor and the function as a generator, but in the other embodiment, the AC motor does not need to have the function as the generator.

(F) The control device of the AC motor according to the present disclosure may be applied not only to the system having only one set of the inverter and the AC motor like the embodiments described above but also to a system having two or more sets of the inverter and the AC motor. Further, the control device of the AC motor according to the present disclosure may be applied to a system of an electric train or the like having a plurality of AC motors connected in parallel to one inverter.

(G) The control device of the AC motor according to the present disclosure is not limitedly applied to the AC motor of the hybrid automobile having the construction shown in FIG. 1 but may be applied to an AC motor of an electric vehicle having any construction. Further, the control device of the AC motor according to the present disclosure may be applied to an AC motor other than the electric vehicle.

The above disclosure has the following aspects.

According to an aspect of the present disclosure, a control device of a three-phase alternate current motor includes: an inverter having a plurality of switching elements for driving the alternate current motor; at least one current sensor, which senses a current flowing in a respective phase among three phases of the alternate current motor at a given sampling timing; and a control means that switches on and off each switching element by feeding back a plurality of dq axis current calculated values, which are obtained by dq transforming a plurality of phase current sensed values in two or more phases sensed by a plurality of current sensors, or obtained by dq transforming a phase current sensed value of one phase and a current estimated value of other phase estimated from the phase current sensed value of the one phase, to a plurality of dq axis current command values, or by feeding back a torque estimated value, which is estimated based on the dq axis current calculated values, to a torque command value, so that the control means controls the current passing through the alternate current motor. The control means includes at least one first order current operation part that: expands a phase current sensed value of one phase in Fourier series as a function of an electric angle; extracts a first order component of the Fourier series; and operates a first order current operated value of the one phase. The at least one first order current operation part integrates a calculated value based on the phase current sensed value of the one phase at an integral angle for k periods of the electric angle so that Fourier coefficients are calculated. The integral angle is set by dividing the k periods of the electric angle with N, and k represents a natural number, and N represents another natural number.

Alternatively, the at least one current sensor may include a plurality of current sensors, which are arranged in two or more phases, respectively. The at least one first order current operation part includes a plurality of first order current operation parts. The plurality of first order current operation parts of the control means: expand the phase current sensed values in two or more phases in Fourier series, respectively; extract the first order components of the Fourier series, respectively; and operate the first order operated values of the two or more phases.

Alternatively, the at least one current sensor may include only one current sensor, which is arranged in only one corresponding phase. The at least one first order current operation part of the control means: expands the phase current sensed value of the only one corresponding phase in Fourier series; extracts the first order component of the Fourier series; and operates the first order operated value of the only one corresponding phase. The control means further includes an other phase first order current estimation part that estimates the first order current estimated value of an other phase in such a manner that Fourier coefficients relating to the first order current operated value of the only one corresponding phase are common in the other phase, and the electric angle is shifted by one-third of a period with respect to the first order current operated value of the only one corresponding phase.

Alternatively, the electric angle may be referred as θ, a phase difference of a command voltage vector with respect to a q axis is referred as φq, and a phase angle is expressed by (θ+φq), which is obtained by dividing the k periods of the electric angle with N. The first order current operation part sets the phase angle as the integral angle. Further, the first order current operation part may set the phase difference at the phase angle to be zero, and sets the electric angle, which is obtained by dividing the k periods of the electric angle with N, as the integral angle.

In the above control device, even in the case where the phase current has the higher order components superimposed thereon or even in the case where the phase current is offset, the dq axis currents can be calculated on the basis of the first order component extracted from Fourier series in which the phase current is expanded. Hence, a current feedback control is performed on the basis of the dq axis current calculated values not containing the higher order components, so that command duties of the respective phases generated as the result do not have higher order components superimposed thereon. Therefore, it is possible to reduce noises caused by the switching noises or the like of the inverter. In particular, in an overmodulation range, the effect of reducing noises becomes remarkable.

Further, by removing a direct component of 0-th order component, it is possible to correct the offset of the phase current and to suppress a torque variation and a power variation of the AC motor.

Still further, a current vector is not smoothed by the use of a low-pass filter so as to remove sixth order components in a square wave control mode, so that it is possible to avoid a problem such that a reduction in torque response is caused by lowering a gain.

Alternatively, an interval of consecutive integral angles may be constant.

Here, the way of performing an integration processing is different between in the case where the sampling timing of the current sensor is synchronous with an integration timing corresponding to the integral angle and in the case where the sampling timing of the current sensor is not synchronous with the integration timing corresponding to the integral angle.

Alternatively, the sampling timing of the at least one current sensor may be set synchronously with an integration timing corresponding to the integral angle, and the first order current operation part integrates the calculated value based on the phase current sensed value at each integration timing.

In the case where the sampling timing of the current sensor is not synchronous with the integration timing, as is the case where the current is sampled at a timing synchronous with a PWM carrier wave of a given period in a PWM control, the phase current sensed value at the integration timing is not directly sensed.

Alternatively, the sampling timing of the at least one current sensor may be set asynchronously with the integration timing corresponding to the integral angle. The first order current operation part calculates a phase current interpolated value by linearly interpolating the phase current sensed values of the sampling timings before and after the integration timing at each integration timing, and the first order current operation part integrates the calculated value based on the phase current interpolated value.

In the meantime, a malfunction caused by higher order components superimposed on the phase current or by the offset of the phase current presents a problem particularly in a high rotation and high output range. Conversely, in a low rotation range or in a low output range, the malfunction does not comparatively present a problem. In contrast to this, in the low rotation range, the k periods of the electric angle for operating Fourier coefficients and the first order current become longer, which hence results in reducing a feedback response. Hence, it is preferable in some cases not to employ the Fourier series expansion of the phase current sensed value.

Alternatively, the control means may further include a current selection means for switching between a Fourier series expansion mode and a normal mode. In the Fourier series expansion mode, the dq axis current calculated values are calculated by dq transforming the first order current operated value or a first order current estimated value based on the first order current operated value. The first order current operated value is extracted by the first order current operation part as first order components of Fourier series expansion of the phase current sensed value. In the normal mode, the dq axis current calculated values are calculated by directly dq transforming the phase current sensed value or a current estimated value based on the phase current sensed value.

Alternatively, when the number of revolutions of the alternate current motor is more than a given threshold number of revolutions, and a modulation factor of the inverter is more than a given modulation factor threshold value, the current selection means may select the Fourier series expansion mode.

Alternatively, when the number of revolutions of the alternate current motor is more than a given threshold number of revolutions, and an inputted torque command value is more than a given torque threshold value, the current selection means may select the Fourier series expansion mode.

The present disclosure can be applied, for example, to a control device of an AC motor mounted in an electric vehicle such as a hybrid automobile and an electric automobile. In the AC motor mounted in the electric vehicle, a higher request especially for silence and drivability is made and hence the application of the control device of an AC motor according to the present disclosure can produce a significant effect of preventing noises and suppressing a torque variation and a power variation.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device of a three-phase alternate current motor comprising:
   an inverter having a plurality of switching elements for driving the three-phase alternate current motor;
   at least one current sensor, which senses a current flowing in a respective phase among three phases of the alternate current motor at a given sampling timing; and
   a control means that switches on and off each switching element of the inverter by feeding back a plurality of dq axis current calculated values, which are obtained by dq transforming a plurality of phase current sensed values in two or more phases sensed by a plurality of current sensors, or obtained by dq transforming a phase current sensed value of one phase and a current estimated value of other phase estimated from the phase current sensed value of the one phase, to a plurality of dq axis current command values, or by feeding back a torque estimated value, which is estimated based on the dq axis current calculated values, to a torque command value, so that the control means controls the current passing through the three-phase alternate current motor,
   wherein the control means includes at least one first order current operation part that: expands a phase current sensed value of one phase in Fourier series as a function of an electric angle; extracts a first order component of the Fourier series; and operates a first order current operated value of the one phase,
   wherein the at least one first order current operation part integrates a calculated value based on the phase current sensed value of the one phase at an integral angle for k periods of the electric angle so that Fourier coefficients are calculated,
   wherein the integral angle is set by dividing the k periods of the electric angle by N, and
   wherein k represents a natural number, and N represents another natural number,
   wherein the at least one first order current operation part calculates the first order current operated value of the one phase based on the Fourier coefficients, wherein the control means dq transforms the first order current operated value to calculate the dq axis current calculated value, wherein the control means feeds back the dq axis current calculated value to the dq axis current command value, or the torque estimated value, which is estimated based on the dq axis current calculated value, to the torque command value.

2. The control device according to claim 1,
wherein the at least one current sensor includes a plurality of current sensors, which are arranged in two or more phases, respectively, and
wherein the at least one first order current operation part includes a plurality of first order current operation parts, and
wherein the plurality of first order current operation parts of the control means: expand the phase current sensed values in two or more phases in Fourier series, respectively; extract the first order components of the Fourier series, respectively; and operate the first order operated values of the two or more phases.

3. The control device according to claim 1,
wherein the at least one current sensor includes only one current sensor, which is arranged in only one corresponding phase,
wherein the at least one first order current operation part of the control means: expands the phase current sensed value of the only one corresponding phase in Fourier series; extracts the first order component of the Fourier series; and operates the first order operated value of the only one corresponding phase, and
wherein the control means further includes an other phase first order current estimation part that estimates the first order current estimated value of an other phase in such a manner that Fourier coefficients relating to the first order current operated value of the only one corresponding phase are common in the other phase, and the electric angle is shifted by one-third of a period with respect to the first order current operated value of the only one corresponding phase.

4. The control device according to claim 1,
wherein the electric angle is referred as $\theta$, a phase difference of a command voltage vector with respect to a q axis is referred as $\phi q$, and a phase angle is expressed by $(\theta+\phi q)$, which is obtained by dividing the k periods of the electric angle by N, and
wherein the first order current operation part sets the phase angle as the integral angle.

5. The control device according to claim 4,
wherein the first order current operation part sets the phase difference at the phase angle to be zero, and sets the electric angle, which is obtained by dividing the k periods of the electric angle by N, as the integral angle.

6. The control device according to claim 1,
wherein an interval of consecutive integral angles is constant.

7. The control device according to claim 1,
wherein the sampling timing of the at least one current sensor is set synchronously with an integration timing corresponding to the integral angle, and
wherein the first order current operation part integrates the calculated value based on the phase current sensed value at each integration timing.

8. The control device according to claim 1,
wherein the sampling timing of the at least one current sensor is set asynchronously with the integration timing corresponding to the integral angle,
wherein the first order current operation part calculates a phase current interpolated value by linearly interpolating the phase current sensed values of the sampling timings before and after the integration timing at each integration timing, and
wherein the first order current operation part integrates the calculated value based on the phase current interpolated value.

9. The control device according to claim 1,
wherein the control means further includes a current selection means for switching between a Fourier series expansion mode and a normal mode,
wherein, in the Fourier series expansion mode, the dq axis current calculated values are calculated by dq transforming the first order current operated value, or a first order current estimated value based on the first order current operated value,
wherein the first order current operated value is extracted by the first order current operation part as first order components of Fourier series expansion of the phase current sensed value, and
wherein, in the normal mode, the dq axis current calculated values are calculated by directly dq transforming the phase current sensed value or a current estimated value based on the phase current sensed value.

10. The control device according to claim 9,
wherein, when the number of revolutions of the alternate current motor is more than a given threshold number of revolutions, and a modulation factor of the inverter is more than a given modulation factor threshold value, the current selection means selects the Fourier series expansion mode.

11. The control device according to claim 9,
wherein, when the number of revolutions of the alternate current motor is more than a given threshold number of revolutions, and an inputted torque command value is more than a given torque threshold value, the current selection means selects the Fourier series expansion mode.

* * * * *